US006730144B2

United States Patent
Tanaka et al.

(10) Patent No.: US 6,730,144 B2
(45) Date of Patent: May 4, 2004

(54) AIR PURIFYING FILTER USING MODIFIED ENZYMES

(75) Inventors: Atsuo Tanaka, Kyoto (JP); Mikiko Gokano, Kanagawa (JP); Kazuro Isomae, Kanagawa (JP)

(73) Assignee: Nikki - Universal Co., Ltd., Tokyo (JP)

( * ) Notice: Subject to any disclaimer, the term of this patent is extended or adjusted under 35 U.S.C. 154(b) by 305 days.

(21) Appl. No.: 10/013,711

(22) Filed: Dec. 13, 2001

(65) Prior Publication Data

US 2004/0050254 A1 Mar. 18, 2004

Related U.S. Application Data

(63) Continuation-in-part of application No. 09/230,114, filed on Jan. 22, 1999, now Pat. No. 6,579,352.

(51) Int. Cl.⁷ ............ B01D 45/00; A61L 9/00; C12N 11/14

(52) U.S. Cl. ............ 95/285; 55/524; 55/527; 96/226; 422/4; 422/28; 435/176; 435/177; 435/181

(58) Field of Search ............ 95/273, 285; 55/522, 55/524, 527; 96/226; 422/4, 28, 176; 435/177, 180, 181

(56) References Cited

U.S. PATENT DOCUMENTS

| | | |
|---|---|---|
| 3,519,538 A | 7/1970 | Messing et al. |
| 3,968,297 A | 7/1976 | Sauer |
| 4,006,059 A | 2/1977 | Butler |
| 4,033,817 A | 7/1977 | Gregor |
| 4,251,631 A | 2/1981 | Simon |
| 4,493,894 A | 1/1985 | Miyashiro et al. |
| 4,748,121 A | 5/1988 | Beaver et al. |
| 4,749,390 A | 6/1988 | Burnett et al. |
| 4,749,653 A | 6/1988 | Lee et al. |
| 4,983,510 A * | 1/1991 | Lardinois et al. ............ 435/4 |
| 5,021,345 A | 6/1991 | Urban et al. |
| 5,051,184 A | 9/1991 | Taylor |
| 5,055,113 A | 10/1991 | Larson et al. |
| 5,098,417 A | 3/1992 | Yamazaki et al. |
| 5,102,799 A | 4/1992 | Urban et al. |
| 5,130,237 A | 7/1992 | Thomas et al. |
| 5,395,411 A | 3/1995 | Kobayashi |
| 5,527,672 A | 6/1996 | Mansfield et al. |
| 5,614,105 A | 3/1997 | Heilmann et al. |
| 5,620,706 A | 4/1997 | Dumitriu et al. |
| 5,719,228 A | 2/1998 | Taylor et al. |
| 5,889,073 A | 3/1999 | Zhang et al. |
| 6,228,135 B1 | 5/2001 | Sugo et al. |
| 6,372,472 B1 | 4/2002 | Nehls et al. |
| 6,579,352 B1 * | 6/2003 | Tanaka et al. ............ 96/226 |
| 2002/0102180 A1 | 8/2002 | Sheldon |

FOREIGN PATENT DOCUMENTS

| | | |
|---|---|---|
| GB | 1 486 305 | 9/1977 |
| GB | 1 503 879 | 3/1978 |
| JP | 402245190 A | 9/1990 |
| WO | WO98/04334 * | 2/1998 |

OTHER PUBLICATIONS

"Filter Medium, Fire–Resistant, High–Efficienty," Military Specification, MIL–F–51079C, Mar. 14, 19885.
"Primary Containment of Biohazards," Office of Health and Safety, Centers for Disease Control and Prevention, 2$^{nd}$ Edition, Sep. 2000.

* cited by examiner

Primary Examiner—Chester T. Barry
(74) Attorney, Agent, or Firm—Fish & Richardson P.C.

(57) ABSTRACT

An air purifying filter includes a modified enzyme immobilized on a surface of a carrier. The modified enzyme has been modified with a bonding agent that improves bonding. The surface of the carrier has not been rendered to be water repellant prior to immobilizing the modified enzyme on the surface of the carrier. The bonding agent improves bonding of the modified enzyme to the carrier.

33 Claims, 6 Drawing Sheets

Fig. 2

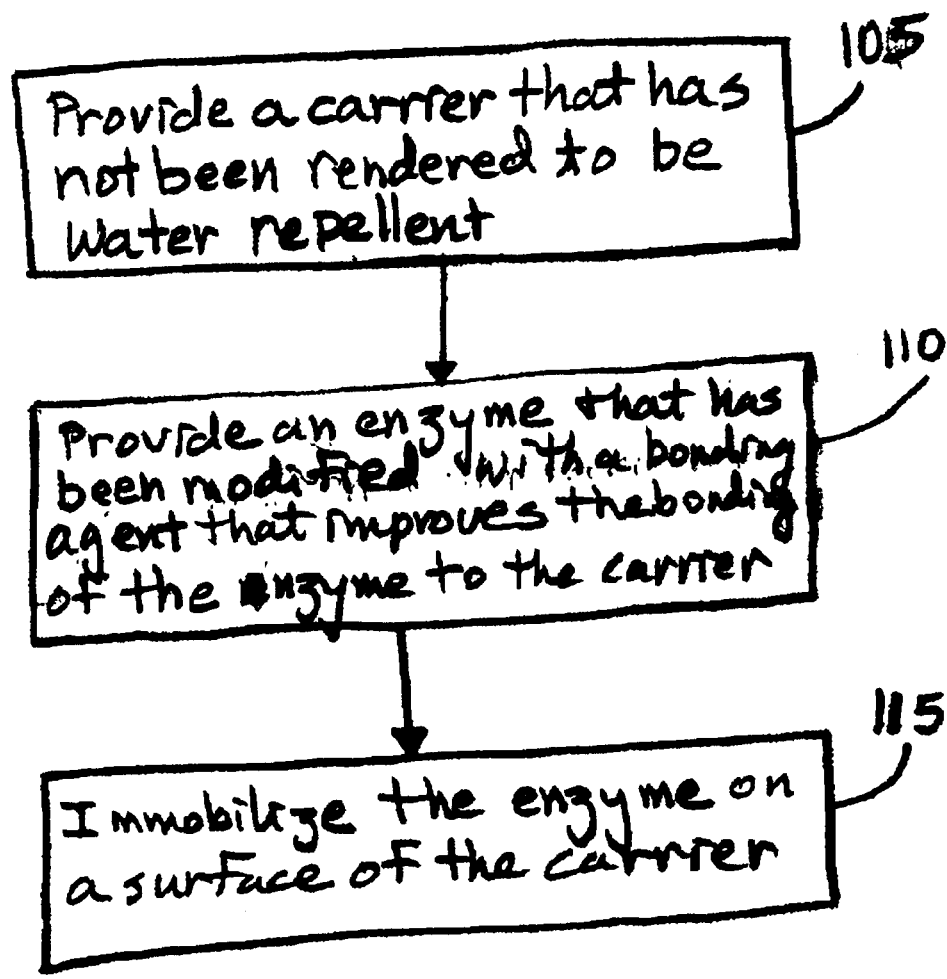

AIR PURIFYING FILTER USING MODIFIED ENZYMES

RELATED APPLICATIONS

Figure 1:
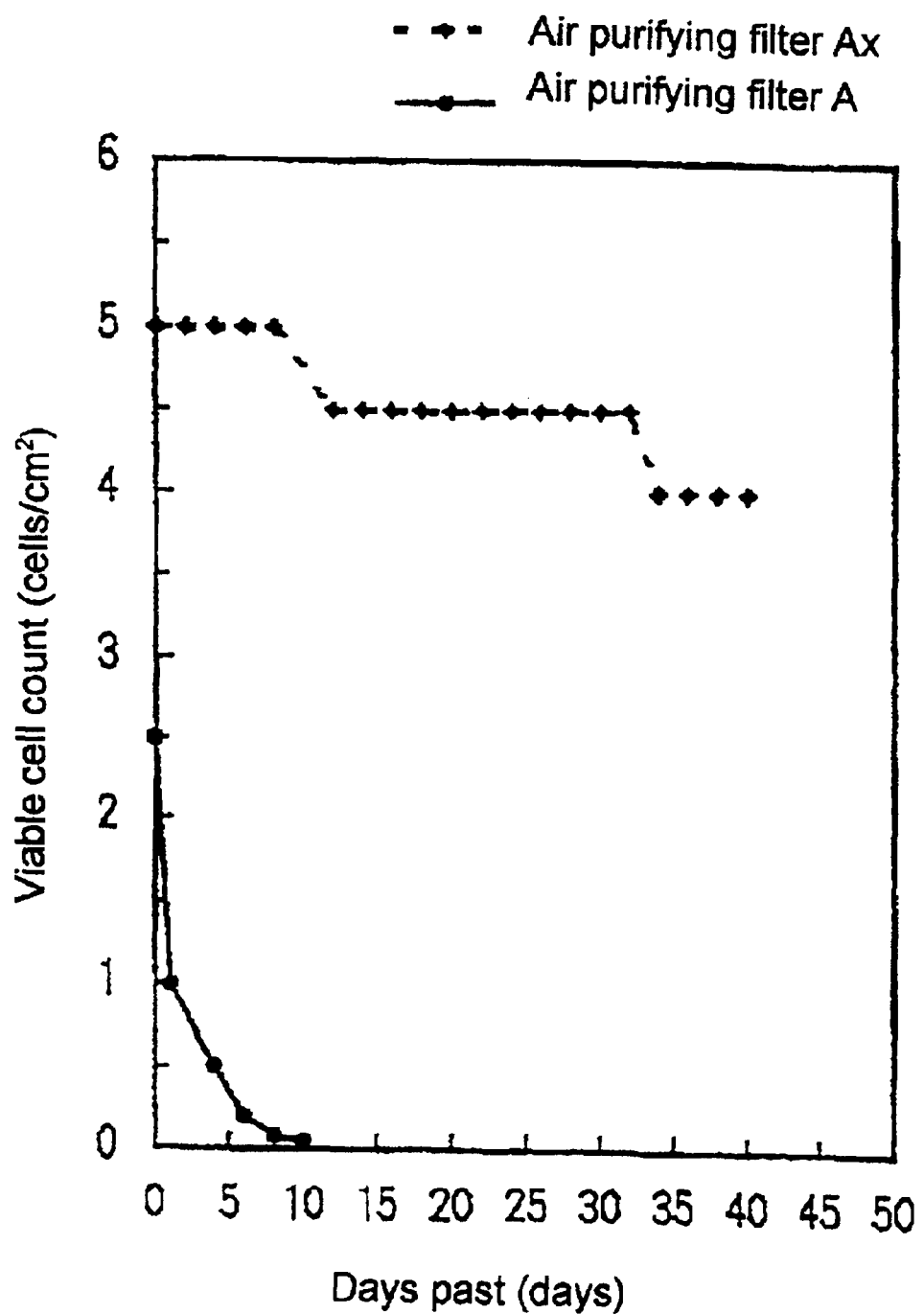

This application is a continuation-in-part of and claims priority from U.S. application Ser. No. 09/230,114 filed on Jan. 22, 1999 now U.S. Pat. No. 6,579,352 and titled Air Purifying Filter. The disclosure of the prior application is considered part of (and is incorporated by reference in) the disclosure of this application.

TECHNICAL FIELD

This invention relates to an air purifying filter having a modified enzyme immobilized on a surface of a carrier. The invention particularly relates to an air purifying filter having an enzyme immobilized on a surface of a HEPA filter which is composed of boron-silica glass fibers not rendered to be water repellent, ion-exchange fibers having functional groups, or boron-silica glass fibers coated with a polymer having functional groups.

BACKGROUND

Various air purifiers (air cleaners) and air washers are known as apparatus for removing unwanted materials from air. Air purifiers (air cleaners) are apparatuses that primarily depend on air purifying filters (air filters) for filtering off unwanted materials in air such as suspended fine particles (e.g. dust) on which gaseous contaminants, fats/oils and microorganisms such as bacteria are occasionally deposited. Air washers are apparatus which typically involve the washing of air with water to remove dirt/dust particles, microorganisms, etc. from air.

The first mentioned air purifying filters are available in various types which have been developed to suit specific factors such as the material to be removed, its particle size and the efficiency of particle capture. The filters are also available in various shapes including mats, wedges, fold-ins, baskets, bags, panels and boxes. However, single use of the conventional air purifying filters has been unable to achieve complete removal of air-borne microorganisms such as molds, bacteria and fungi. Further, the microorganisms captured on the filters are difficult to control or kill and may grow on the filters and scatter about to cause secondary contamination; therefore, the existing air purifying filters have not necessarily given satisfactory results in the air purification treatment.

Under the circumstances, the present inventors thought of using enzymes effective in controlling or killing air-borne microorganisms such as mold, bacteria and fungi. Various techniques have so far been proposed as bactericidal/sterilizing or antimicrobial means using enzyme and they include the following.

Japanese Patent Publication No. 21422/1979 discloses a method of controlling microorganisms (e.g. heat-resistant cell spores) in processed food which is characterized in that at least one member of the group consisting of urea, thioglycolic acid and mercaptoethanol, and a bacterial cell wall lysing enzyme are added to the food or starting materials thereof and the mixture is held for a specified time and subsequently heat treated.

Japanese Patent Public Disclosure No. 30584/1989 describes a biocatalyst immobilizing carrier for typical use in the food industry which has a microorganism or an enzyme that work as a biocatalyst immobilized on a carrier together with a lysing enzyme. According to the patent, exemplary microorganisms include Gram-negative bacteria, Gram-positive bacteria, yeasts and molds; useful enzymes are hydrolases such as arnylase, protease and lipase; lysing enzymes include lysozyme, endo-N-acetylmuramidase, endo-N-acetylglucosaminidase, autolysin, ensopeptidase-type bacterial cell wall lysing enzymes, amidase-type bacterial cell wall lysing enzymes, mold cell wall lysing enzymes and yeast cell wall lysing enzymes.

Japanese Patent Public Disclosure No. 5822/1990 discloses an alcoholic preparation for use on raw vegetable which incorporates egg white lysozyme as a natural antimicrobial agent and which has the pH adjusted to be within the range of 2.0–7.0, as well as a modifier for use on raw vegetable which incorporates an organic acid and an organic acid salt or a phosphate salt, has the pH adjusted to be within the range of 2.0–7.0 and also incorporates egg white lysozyme as an antimicrobial agent.

Japanese Patent Public Disclosure No. 23856/1990 discloses a food preservation method which, for the purpose of effectively preventing putrefaction and deterioration of food, adds a polyglycerin fatty acid ester, lysozyme and protamine to the food being produced.

Japanese Patent Publication No. 22144/1991 describes a method of food sterilization which comprises allowing a lysing enzyme such as lysozyme, kinase or β-1,6-glucanase to act upon food and then subjecting it to an ultrasonic treatment.

Japanese Patent Public Disclosure No. 76362/1993 describes a process for producing lysozyme-containing particles which comprises the steps of applying a spray of an aqueous lysozyme slurry into the reaction chamber of a fluidized-bed reactor together with the core particles of a hydratable substance, evaporating the residual water so that the dry lysozyme coating will remain on the particulate core substance, to thereby provide lysozyme-containing particles. The patent teaches that the thus produced lysozyme-containing particles are useful in various kinds of foods, cosmetics, medicines and other applications.

Japanese Patent Public Disclosure No. 276910/1993 discloses a food preservative characterized by the combination of protamine with at least one substance selected from the group consisting of lysozyme, an antimicrobial substance extracted from licorice, vitamin $B_1$ ester and a polyphosphate salt.

Japanese Patent Public Disclosure No. 217749/1994 discloses a food preservative which comprises a caprylic acid monoglyceride and/or a capric monoglyceride in combination with glycine, sodium acetate, lysozyme and an organic acid or an alkali salt thereof, as well as a food preservative which comprises a caprylic acid monoglyceride and/or a capric monoglyceride in combination with glycine, sodium acetate, lysozyme and polyphosphate salt. The patent also teaches that although lysozyme is said to have a lysing effect, its effectiveness is limited to some microbial strains and it cannot be claimed as a practically feasible bacteriostat if used alone.

Japanese Patent Public Disclosure No. 246157/1994 discloses a cell adsorber which has the denatured product of a protein such as lysozyme, avidin or trypsin immobilized on a water-insoluble carrier. According to the patent, cells can be effectively separated or removed from a cell-containing solution by using the cell adsorber.

Japanese Patent Public Disclosure No. 236479/1995 discloses the lysozyme binding of an antimicrobial compound selected from among plant-derived antimicrobial compounds (e.g. perillaldehyde, cinnamaldehyde, salicylaldehyde, anisaldehyde, benzaldehyde and vanillin), antibiotics, synthetic antimicrobial agents, etc. The patent teaches that lysozyme bound to these antimicrobial compounds is useful in medicines, quasi-drugs, foods, etc.

There have also been proposed various inorganic antimicrobial materials which have antimicrobial metals such as silver, zinc and copper supported on inorganic carriers. Examples are inorganic antimicrobial agents having silver, zinc and other ions supported on zeolite through ion-exchange, inorganic antimicrobial agents having metallic silver supported on calcium phosphate through adsorption, inorganic antimicrobial agents having silver ions supported on zirconium phosphate through ion-exchange, and inorganic antimicrobial agents having silver complex salts supported on amorphous silicon oxide through occlusion; these inorganic antimicrobial materials are applied to fibers, plastics, films, paints and various other products (ZEOLITE, vol. 13 No. 2 (1966), pp. 56–63).

Various carriers have also been proposed for use in immobilizing the aforementioned enzymes and they include the following.

Japanese Patent Public Disclosure No. 48825/1974 describes the use of phenolic and aliphatic amine-based ion-exchange resins as carriers for immobilizing egg white lysozyme.

Japanese Patent Public Disclosure No. 48080/1984 discloses the use of platinum coated with Amberlite or aminated polyvinyl alcohol and the like for complex immobilizing of more than one enzyme.

Japanese Patent Public Disclosure No. 49795/1985 discloses the use of nonwoven carriers composed of natural fibers or chemical fibers or mixtures thereof in the web for immobilization treatment of bactericidal lysing enzymes.

Japanese Patent Public Disclosure No. 30584/1989 teaches a column composed of ceramic honeycomb structures, a membrane, particles or a porous body as biocatalyst immobilizing carrier and one which is formed of cordierite is specifically described.

Japanese Patent Public Disclosure No. 256388/1989 teaches the use of an anion-exchange resin as a carrier for supporting inulin-D-fructotransferase.

Japanese Patent Public Disclosure No. 39239/1990 discloses the use of a porous anion-exchange resin as an enzyme immobilizing carrier which has either primary amino groups or secondary amino groups or both as exchange groups.

Japanese Patent Public Disclosure No. 41166/1990 teaches that a porous membrane, fibers or spun yams of ceramics, glass or organic polymers, as well as nets formed by knitting such fibers or spun yarns or particles thereof are suitable as enzyme-immobilizing carriers.

Japanese Patent Public Disclosure No. 269362/1991 teaches the use of lattices as carriers in immunological assay reagents.

Japanese Patent Public Disclosure No. 91117/1994 discloses an air purifier having both a slime bacterial filter and a filter based on an antimicrobial polymer. The patent also teaches the typical use of polyurethane forms, polyethylene, polystyrene, polyacrylamides and/or various photo-crosslinkable or photocurable synthetic polymers as the base for immobilizing slime bacteria produced lysing enzymes and antibiotics.

SUMMARY

As outlined above, it has been proposed in various fields such as food, medicines and cosmetics that enzymes, for example, those having a lysing action as exemplified by lysozyme be used in solution for bactericidal, antimicrobial, preservative, antimold and other purposes.

However, no technical means has ever been proposed in the art that is based on the idea that an air purifying filter made of a specified material can be enhanced in its ability to control, kill or otherwise remove microorganisms by combining the filter with the above-mentioned enzymes having a lysing action.

The present inventors conducted intensive studies by making approaches from various viewpoints in order to enhance the ability of an air purifying filter to control, kill or otherwise remove microorganisms by using it in combination with a lysing enzyme either alone or in the copresence of various proteins, peptides, polysaccharides, etc. As a result, the inventors found that by immobilizing enzymes on the surfaces of carriers which are made of specified materials and which have specified shapes, the ability of the air purifying filter to control, kill or otherwise remove microorganisms could be enhanced and maintained for a prolonged period. The present invention has been accomplished on the basis of this finding.

The invention provides an air purifying filter having an enzyme immobilized on the surface of a carrier.

The invention also provides an air purifying filter having a large amount of enzyme immobilized on the surfaces of a non-water repellent carrier, such as boron-silica glass fibers through covalent bonding and/or ionic bonding.

The invention further provides an air purifying filter which has a large amount of enzyme immobilized on a HEPA filter through covalent bonding and/or ionic bonding, said HEPA filter being based on non-water repellent microfine boron-silica glass fibers having a diameter of no more than 4 $\mu$m.

The invention also provides an air purifying filter having a large amount of enzyme dispersed and immobilized on the surfaces of radical-having ion-exchange fibers through ionic bonding.

Further in addition, the invention provides an air purifying filter characterized on that a large amount of enzyme is dispersed and immobilized, through ionic bonding, on the surfaces of boron-silica glass fibers coated with a polymer having radicals or functional groups.

In another general aspect, an air purifying filter includes a modified enzyme immobilized on a surface of a carrier. The modified enzyme has been modified with a bonding agent that improves bonding. The surface of the carrier has not been rendered to be water repellant prior to immobilizing the modified enzyme on the surface of the carrier. The bonding agent improves bonding of the modified enzyme to the carrier.

Embodiments of the air purifying filter include one or more of the following features. For example, the filter may be used as a HEPA filter. The bonding may include covalent bonding. The carrier may include one or more fibers, such as glass fibers, including boron-silica glass fibers; cellulose fibers, including rayon fibers; and ion-exchange fibers. The fibers may be coated with a polymer having a functional group. The polymer having a functional group may be a polymer having at least one functional group selected from among —NHR (R is not H but an alkyl group selected from among methyl, ethyl, propyl and butyl), —NH$_2$, —C$_6$H$_5$NH$_2$, —COOH and —OH. The modified enzyme may bond to the functional group of the polymer.

The modified enzyme may be immobilized through covalent bonding. The modified enzyme may be either of a single type or a system consisting of two or more types, or it may form a mixture or a compound with a non-enzyme protein, a peptide, and/or a polysaccharide. The enzyme may include at least one lysing enzyme selected from among lysozyme, chitinase, protease, glucose oxidase, glucanase, β-galactosidase, endo-β-N-acetylgluco-saminidase and endolysin. The non-enzyme protein or peptide may be either one bactericidal protein or peptide selected from among protamine, lactoferrin and polylysine. The polysaccharide may be either one of glucan, dextran, mannan, galactomannan, laminaran, carrageenan and agarose.

The modified enzyme may be an enzyme bonded with bromine-N-substituted carbamate; an enzyme bonded with bromine-N-substituted imido carbonate; an enzyme bonded with acetyl cellulose bromide; an enzyme N substituted isourea bromide having the formula of

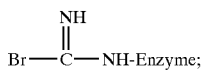

an enzyme N substituted imidocarbonyl dibromide having the formula of

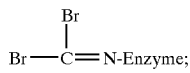

an enzyme N substituted carbamyl bromide having the formula of

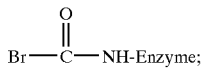

an enzyme substituted acetyl cellulose bromide having the formula of

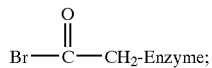

an enzyme substituted glutal aldehyde having the formula of

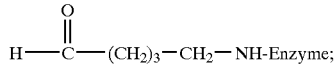

and a mixture of any one or more of the above compounds including, for example, β-1,3-glucanase substituted acetyl cellulose bromide, lysozyme substituted acetyl cellulose bromide, and neutral protease substituted acetyl cellulose bromide.

In another general aspect, an air purifying filter is fabricated by providing a carrier that has not been rendered to be water repellant; providing an enzyme that has been modified with a bonding agent that improves the bonding to the carrier; and immobilizing the enzyme on a surface of the carrier.

The method of fabricating the air purifying filter may include one or more of the features described herein. For example, the carrier may include one or more fibers and the bonding may be covalent bonding. The enzyme may include a mixture of β-1,3-glucanase substituted acetyl cellulose bromide, lysozyme substituted acetyl cellulose bromide, and neutral protease substituted acetyl cellulose bromide.

In another general aspect, an air purifying filter is used to purify air by providing an air filter, placing the air filter in an air handling system, and passing air through the air filter. The air purifying filter includes a modified enzyme immobilized on a surface of a carrier. The modified enzyme has been modified with a bonding agent that improves bonding, the surface of the carrier has not been rendered to be water repellant prior to immobilizing the modified enzyme on the surface of the carrier, and the bonding agent improves bonding of the modified enzyme to the carrier;

The method of purifying the air may include one or more of the features described herein. For example, the air may be purified of one or more of bacillus subtilis, bacillus cereus, and bacillus anthracis. The modified enzyme may include a mixture of β-1,3-glucanase substituted acetyl cellulose bromide, lysozyme substituted acetyl cellulose bromide, and neutral protease substituted acetyl cellulose bromide.

The details of one or more embodiments of the air purifying filter are set forth in the accompanying drawings and the description below. Other features and advantages of the air purifying filter will be apparent from the description, the drawings, and the claims.

DESCRIPTION OF DRAWINGS

FIG. 1 is a graph showing the time-dependent changes in the number of viable cells of a microorganism which was captured with a prior art air purifying filter (air purifying filter Ax of comparative Example 1) and an air purifying filter according to the invention (air purifying filter A of Example 1).

Figure 2:
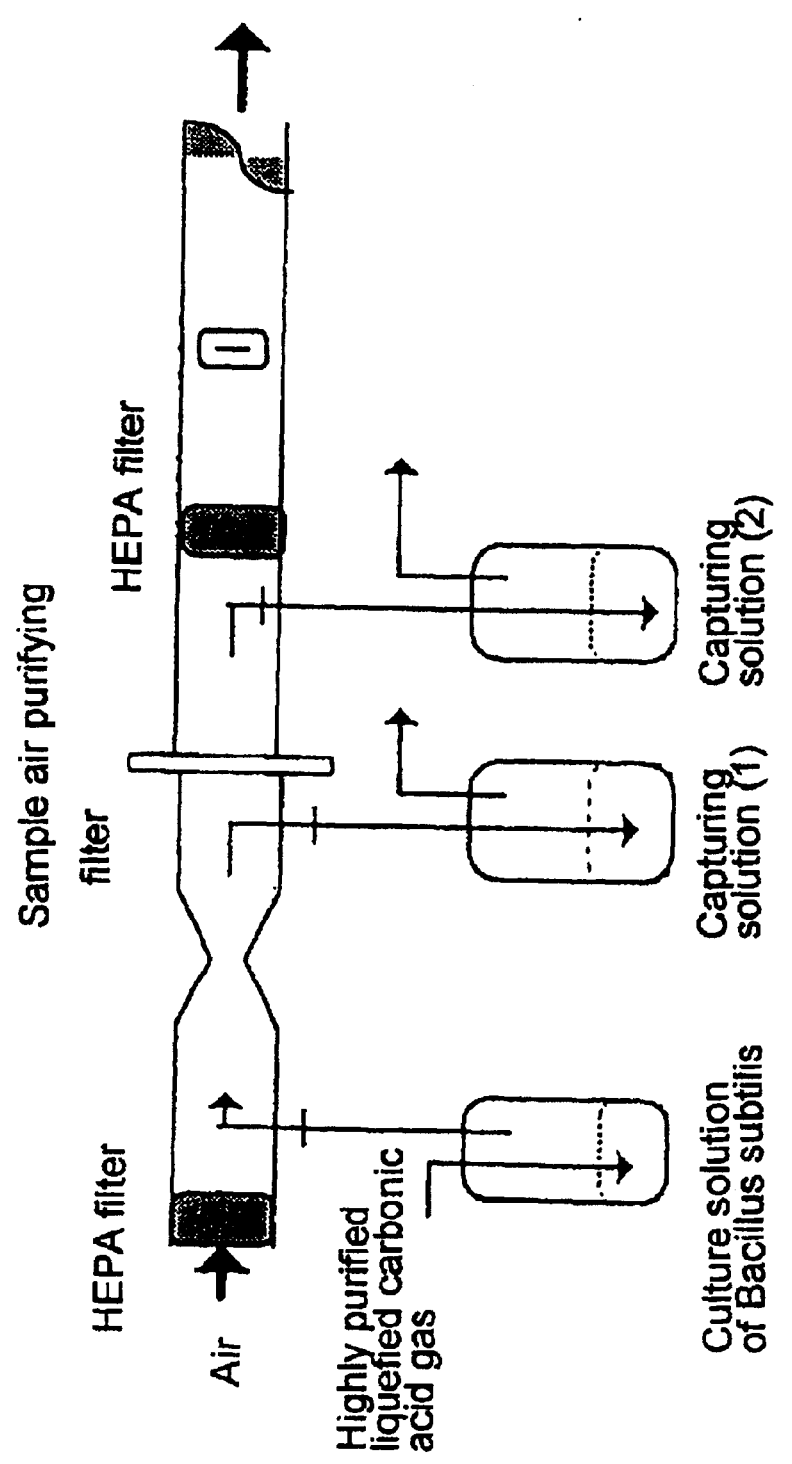

FIG. 2 is a schematic view of the air-borne microorganism measuring apparatus used to evaluate the effectiveness of the air purifying filters used in specified tests.

FIG. 3 is an electron micrograph showing how microorganism cells were captured by an air purifying filter according to the invention (air purifying filter D1 of Example 4).

FIG. 4 is an electron micrograph showing how microorganism cells were captured by a prior art air purifying filter (air purifying filter Dx of Comparative Example 7).

FIG. 5 is a plan view of a carrier resembling cotton.

FIG. 6 is a plan view of a carrier resembling a honeycomb.

FIG. 7 is a plan view of a carrier resembling fibers.

FIG. 8 is a plan view of a carrier resembling filter paper.

FIG. 9 is a plan view of a carrier resembling screens.

FIG. 10 is a plan view of a carrier resembling particulate.

FIG. 11 is a flow chart of a method of fabricating an air purifying filter.

Like reference symbols in the various drawings indicate like elements.

DETAILED DESCRIPTION

The constituent material for the carrier of the air purifying filter according to the invention is not limited in any particular way as long as it is capable of performing as an air purifying filter and has functional groups having activity or function for bonding with modified enzymes; examples include various organic fibers and inorganic fibers such as cellulose fibers, rayon fibers, glass fibers and non-glass synthetic fibers such as ion-exchange fibers, and they may be used in different applications depending upon the characteristics of their origin.

Among glass fibers, boron-silica glass fibers have adequate strength in fiber diameters of 4 μm and less and, hence, are suitable for fabricating high-performance filters capable of efficient capture.

In order to ensure that a large amount of enzyme is effectively immobilized on fibers, it is preferred to use a carrier, such as boron-silicate glass fibers, not rendered to be water-repellent, which therefore has many functional groups. Also preferred to use are ion-exchange fibers having functional groups, as well as glass fibers, and also fibers which are coated with a polymer having functional groups. There are no particular limitations on the functional groups that can be used and preferred examples are —NHR (R is not H but an alkyl group which is either methyl, ethyl, propyl selected from between n-propyl and i-propyl, or butyl selected from among b-butyl, s-butyl, i-butyl and t-butyl), —NH$_2$, —C$_6$H$_5$NH$_2$, —COOH, —OH, etc.

A modified enzyme also or instead can be bonded to the carrier or fibers. Representative examples of modified enzymes include: (1) an enzyme bonded with bromine-N-substituted carbamate; (2) an enzyme bonded with bromine-N-substituted imido carbonate; (3) an enzyme bonded with acetyl cellulose bromide; (4) an enzyme N substituted isourea bromide having the formula of

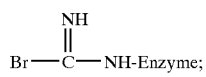

(5) an enzyme N substituted imidocarbonyl dibromide having the formula of

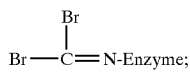

(6) an enzyme N substituted carbamyl bromide having the formula of

(7) an enzyme substituted acetyl cellulose bromide having the formula of

(8) an enzyme N substituted glutal aldehyde having the formula of

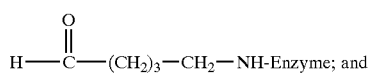

(9) a mixture of any one or more of the above compounds including, for example, a mixture of β-1,3-glucanase substituted acetyl cellulose bromide, lysozyme substituted acetyl cellulose bromide, and neutral protease substituted acetyl cellulose bromide.

The shape of the air purifying filter is not limited in any particular way and it may resemble the shape of cotton as in the form of a nonwoven cloth, or it may assume any other shapes including filter paper, honeycombs, particles and screens. The honeycomb may take any cellular form which may be polygonal (e.g. triangular, rectangular, pentagonal and hexagonal) or corrugated. A preferred example is described in Japanese Patent Public Disclosure No. 15028/1984 and it is an assembly of ceramic fibers (HONEYCLE carrier), in which sheet-like assemblies of ceramic fibers selected from among inorganic fibers such as silica fibers, alumina fibers, aluminosilicate fibers and zirconia fibers which are bound together with silica gel are staked to form honeycombs, thereby producing a honeycomb structure.

In particular, a HEPA filter which was developed as part of the post-war projects of nuclear technology development by making use of the "depth filtration" principle and which is based on microfine glass fibers ($\leq 4$ μm in diameter), reinforced with a small amount (typically no more than 7%) of chopped strand glass fibers and bound together with an organic binder typically contained in no more than 7% is a preferred carrier material since it far excels other filters in terms of low-pressure loss characteristics, high arrest efficiency and high physical strength. HEPA filters include a high-performance filter capable of arresting at least 99.97% of 0.3 μm DOP particles, a quasi-high performance HEPA filter capable of arresting at least 95%–99% of 0.3 μm DOP particles and an ULPA filter of which the arresting performance has been enhanced to an ultrahigh level filter capable of arresting at least 99.9995% of 0.1 μm DOP particles.

The enzymes to be used in the invention are not limited in any particular way as long as they have a lysing action; lysozyme, chitinase, protease, glucose oxidase, glucanase, endo-β-N-acetylgluco-saminidase and endolysin may be mentioned as enzymes having the preferred lysing action; an enzyme that has been modified with a bonding or bridging agent that improves the bonding of the modified enzyme to the carrier; and one or more of these enzymes may be used either alone or in combination with non-enzyme proteins or peptides having a bactericidal action or with polysaccharides. Examples of enzymes that have been modified with a bonding or bridging agent to improve bonding of the modified enzyme to the carrier include (1) an enzyme bonded with bromine-N-substituted carbamate; (2) an enzyme bonded with bromine-N-substituted imido carbonate; (3) an enzyme bonded with acetyl cellulose bromide; (4) an enzyme N substituted isourea bromide having the formula of

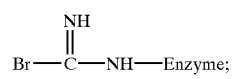

(5) an enzyme N substituted imidocarbonyl dibromide having the formula of

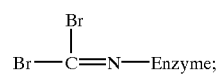

(6) an enzyme N substituted carbamyl bromide having the formula of

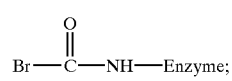

(7) an enzyme substituted acetyl cellulose bromide having the formula of

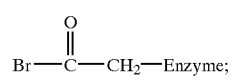

(8) an enzyme N substituted glutal aldehyde having the formula of

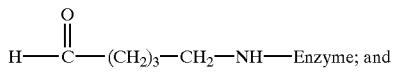

H—C(=O)—(CH$_2$)$_3$—CH$_2$—NH—Enzyme; and (9) a mixture of any one or more of the above compounds including, for example, a mixture of β-1,3-glucanase substituted acetyl cellulose bromide, lysozyme substituted acetyl cellulose bromide, and neutral protease substituted acetyl cellulose bromide. These modified enzymes form covalent bonds with the carrier. One or more of these modified enzymes can be mixed together in a solution and then immobilized or bonded to the carrier.

Examples of the proteins and peptides having a bactericidal action include protamine, lactoferrin and polylysine.

Enzymes, particularly lysozyme, are capable of efficient glycosylation with polysaccharides through chemical covalent bonding to exhibit a marked antimicrobial action. Exemplary polysaccharides include glucan, dextran, mannan, galactomannan, lamiranan, carragee and agarose. One or more of these polysaccharides may be used.

Examples of mixtures or chemical compounds of enzymes with other proteins or peptides include the lysozyme/protamine and lysozyme/apolactoferrin combinations. Examples of the mixtures or chemical compounds of enzymes with polysaccharides include the lysozyme/glucan and lysozyme/galactomannan combinations.

The air purifying filter of the invention can be used in various consumer and industrial situations that require air purification. In particular, it finds optimal use in semiconductor-, food-, pharmaceutical manufacturing, cosmetic manufacturing and hospital-related facilities and the like. With the air purifying filter of the invention, air-borne bacteria and fungi which have defied effective treatment with the existing air purifying filters, in particular, Bacillus subtilis, Micrococcus luteus, Staphylococci, Streptococci and other microorganisms that are resistant to dryness and which remain air-borne for a prolonged time, can be controlled, killed or otherwise removed by direct lysis reaction to purify the air. An added advantage of the air purifying filter of the invention concerns microorganisms such as long rods which have very small cross-sectional areas; if the microorganisms captured by the conventional air purifying filters are very small, they may occasionally slip out of the pores in the filter through their own peristalsis in contrast, and the microorganisms captured on the air purifying filter of the invention will be killed or otherwise controlled by the lysing action of the enzyme and will no longer slip out of the pores in the filter. As a further problem, a conventional air purifying filter which is incapable of effective control of the captured microorganisms has the potential to cause secondary contamination of air as the result of regrowth and scattering about of the captured microorganisms; in contrast, the air purifying filter of the invention continues to exhibit satisfactory lysing action on the retained microorganisms and by killing or otherwise controlling such microorganisms effectively, secondary contamination of air can be prevented for a prolonged time.

EXAMPLES

The present invention will now be described below in greater detail with reference to Examples, Comparative Examples and Tests. It should, however, be noted that the invention is in no way limited by these Examples.

Example 1

A HEPA filter of Nippon Muki Co., Ltd. (trade name: ATOMOS) having a high arrest efficiency of at least 99.97% in a 0.3 μm monodisperse DOP test was immersed in a toluene solution of 10% γ-aminopropyl triethoxysilane at room temperature for 12 hours, washed with toluene and air dried at room temperature to produce a silanylated HEPA filter. The silanylated HEPA filter was immersed in a 1% aqueous glutaraldehyde solution at room temperature for 6 hours so that aldehyde groups were introduced into the surfaces of the silanylated HEPA filter. Thereafter, the filter was washed with water and left in a 50 mM acetate buffer solution containing 1% protamine and 1% lysozyme for 24 hours. Thereafter, the HEPA filter to which the protamine and lysozyrne were immobilized was further washed with a buffer solution prepared by mixing a 500 mM NaCl solution with a 500 mM acetic acid solution. Upon air drying, the physical adsorption of the enzyme on the HEPA filter was removed to leave only the protamine and lysozyrne contents that were immobilized through covalent bonding. The thus prepared filter was designated as air purifying filter A.

Comparative Example 1

The untreated HEPA filter which was used in Example 1 was designated as air purifying filter Ax.

Comparative Example 2

The HEPA filter used in Example 1 was silanylated and had aldehyde groups introduced into the surfaces as in Example 1 to thereby prepare air purifying filter Ay.

Example 2

The procedure of Example 1 was repeated, except that the carrier HEPA filter was replaced by an air conditioning resin-bonded nonwoven fabric filter (product of TOYOBO CO., LTD.). Thus, air purifying filter B was prepared that had only protamine and lysozyme left immobilized through covalent bonding.

Comparative Example 3

The untreated air conditioning resin-bonded nonwoven fabric filter used in Example 2 was designated as air purifying filter Bx.

Comparative Example 4

The air conditioning resin-bonded nonwoven fabric filter used in Example 2 was silanylated and had aldehyde groups introduced into the surfaces as in Example 2 to thereby prepare air purifying filter By.

Example 3

The procedure of Example 1 was repeated, except that the carrier HEPA filter was replaced by a honeycomb carrier (tradename: "HONEYCLE" of NICHIAS CORP.) which was prepared by stacking sheets of ceramic fibers to form 600 honeycomb cells. Thus, air purifying filter C was prepared as in Example 1 that had only protamine and lysozyrne left immobilized through covalent bonding.

Comparative Example 5

The untreated honeycomb carrier used in Example 3 was designated air purifying filter Cx.

Comparative Example 6

The honeycomb carrier used in Example 3 was silanylated and had aldehyde groups introduced into the surfaces as in Example 3 to thereby prepare air purifying filter Cy.

Test 1

A sample air purifying filter unit (200 mm×200 mm×150 mm) was placed in a closed 100-L apparatus for testing air-borne microorganism removing performance and the air within the apparatus which contained $1\times10^5$ air-borne microorganism cells per 100-L was circulated at a flow rate of 10-L per minute by means of a blower. After a specified time of circulation treatment, the air-borne microorganism cells in the test apparatus were collected on an agar medium and cultured aerobically at a temperature of 30° C. for 120 hours. Thereafter, the number of viable cells in 100-L of the sample air was visually counted. The results are shown in Tables 1–6.

TABLE 1

| | No. of Viable Cells (per 100 L) |
|---|---|
| Example 1 | <10 |
| Comp. Ex. 1 | 100 |
| Comp. Ex. 2 | 100 |

Table 1 shows the results of the 24 hours circulation treatment with the air purifying filter of Example 1 as well as the air purifying filters Ax and Ay of Comparative Examples 1 and 2, respectively.

TABLE 2

| | No. of Viable Cells (per 100 L) |
|---|---|
| Example 1 | <10 |
| Comp. Ex. 1 | 300 |
| Comp. Ex. 2 | 300 |

Table 2 shows the results of the 2 hours circulation treatment with the air purifying filter A of Example 1 as well as the air purifying filters Ax and Ay of Comparative Examples 1 and 2, respectively.

As is clear from Tables 1 and 2, the HEPA filter having no enzymes immobilized thereto also showed high physical performance in trapping microorganism cells; however, the air purifying filter of the invention which had protamine and lysozyme immobilized through covalent bonding had at least 10 times greater purification performance in killing the microorganism cells by adsorbing them and lysing their cell walls with the aid of the immobilized lysozyme.

TABLE 3

| | No. of Viable Cells (per 100 L) |
|---|---|
| Example 2 | <10 |
| Comp. Ex. 3 | 3000 |
| Comp. Ex. 4 | 3000 |

Table 3 shows the results of the 24 hours circulation treatment with the air purifying filter B of Example 2 as well as the air purifying filters Bx and By of Comparative Examples 3 and 4, respectively.

TABLE 4

| | No. of Viable Cells (per 100 L) |
|---|---|
| Example 2 | <10 |
| Comp. Ex. 3 | 8000 |
| Comp. Ex. 4 | 8000 |

Table 4 shows the results of the 2 hours circulation treatment with the air purifying filter B of Example 2 as well as the air purifying filters Bx and By of Comparative Examples 3 and 4, respectively.

As is clear from Tables 3 and 4, the air purifying filter of the invention which had protamine and lysozyme immobilized on the air conditioning resin-bonded nonwoven fabric filter which was initially low in microorganism trapping performance exhibited at least 300 times as great purification performance in killing the microorganism cells as the air conditioning resin-bonded nonwoven fabric filter which had no enzymes immobilized thereto.

TABLE 5

| | No. of Viable Cells (per 100 L) |
|---|---|
| Example 3 | <30 |
| Comp. Ex. 5 | 10000 |
| Comp. Ex. 6 | 10000 |

Table 5 shows the results of the 24 hours circulation treatment with the air purifying filter C of Example 3 as well as the air purifying filters Cx and Cy of Comparative Examples 5 and 6, respectively.

TABLE 6

| | No. of Viable Cells (per 100 L) |
|---|---|
| Example 3 | <100 |
| Comp. Ex. 5 | 10000 |
| Comp. Ex. 6 | 10000 |

Table 6 shows the results of the 2 hours circulation treatment with the air purifying filter C of Example 3 as well as the air purifying filters Cx and Cy of Comparative Examples 5 and 6, respectively.

As is clear from Tables 5 and 6, the air purifying filter of the invention which had protamine and lysozyme immobilized on the honeycomb carrier which was fabricated by stacking sheets of ceramic fibers in honeycombs which were hardly capable of trapping microorganism cells exhibited at least 100 times as great purification performance by killing the microorganism cells as the air conditioning honeycomb carrier which had no enzymes immobilized thereto.

Test 2

A 200 mm×200 mm section was taken from each of the air purifying filter A of Example 1 and the air purifying filter Ax of Comparative Example 1 and each section was placed in a filter holder in an experimental duct, through which air containing 210 air-borne microorganism cells in every 30-L challenge was supplied at a flow rate of 30 L per minute by means of a blower; thereafter, each air purifying filter was stored at room temperature in a desiccator held at a relative humidity of 60%; and a portion of each filter was taken at given time intervals and the number of viable cells as captured by the filter was counted by a poured culture method. The results are shown in FIG. 1, which is a graph depicting the survival curve of the trapped viable cells; the vertical axis of the graph plots the viable cell count (cells/cm$^2$) and the horizontal axis plots the days past. As is clear from FIG. 1, the viable cells retained on the air purifying filter A of Example 1 of the invention which had the enzyme immobilized thereon decreased rapidly in number and one week later, few viable cells could be detected. In contrast, the viable cells retained on the air purifying filter Ax of Comparative Example 1 decreased only slightly in number and most of them remained when one month had passed. Thus, it was supported that the air purifying filter of the invention which had the enzyme immobilized thereon was capable of air purification by killing the captured microorganism cells.

Example 4

A filter paper-like carrier for use in a pseudo-HEPA filter (product of HOKUETSU PAPER MILLS, LTD.) which was composed of boron-silica glass fibers not rendered to be water repellent and which had an arrest efficiency of at least 99% in a 0.3 μm monodisperse DOP test was immersed in a toluene solution of 10% γ-aminopropyl triethoxysilane at room temperature for 12 hours, washed with methanol and air dried at room temperature to produce a silanylated filter paper-like carrier. The silanylated filter-paper like carrier was immersed in a 2.5% aqueous glutaraldehyde solution at room temperature for 1 hour so that aldehyde groups were introduced into the silanylated filter paper-like carrier. The filter paper-like carrier into which the aldehyde groups were introduced was washed with water; further washed with a buffer solution (pH 7) prepared by mixing a 500 mM NaCl solution with a 500 mM acetic acid solution; thereafter, was immersed in a 1% lysozyme-containing aqueous solution (S1) for 3 hours so as to immobilize the lysozyme. The filter paper-like carrier having the lysozyme immobilized thereon was further washed with a buffer solution of pH 7 (S2) prepared by mixing a 500 mM NaCl solution with a 500 mM acetic acid solution. Upon air drying, the physical adsorption of the enzyme on the filter paper-like carrier was removed to leave only the lysozyme content that was immobilized through covalent bonding. The thus prepared filter was designated as air purifying filter D1.

Example 5

The procedure of Example 4 was repeated, except that the aqueous solution (S1) was replaced by an aqueous solution containing 1% protamine and 1% lysozyme. Thus, air purifying filter D2 was prepared that had only protamine and lysozyrne left immobilized through covalent bonding.

Example 6

The procedure of Example 4 was repeated, except that the aqueous solution (S1) was replaced by an aqueous solution containing 0.2% glucan and 1% lysozyme. Thus, air purifying filter D3 was prepared that had only glucan and lysozyrne left immobilized through covalent bonding.

Example 7

The procedure of Example 4 was repeated, except that the aqueous solution (S1) was replaced by an aqueous solution containing 1% protamine, 0.2% glucan and 1% lysozyme. Thus, air purifying filter D4 was prepared that had only protamine, glucan and lysozyme left immobilized through covalent bonding.

Comparative Example 7

The untreated filter paper-like carrier for use in a pseudo-HEPA filter which was used in Example 4 and composed of the boron-silica glass fibers not rendered to be water repellent was designated air purifying filter Dx.

Example 8

A filter paper-like carrier for common use in a pseudo-HEPA filter (product of HOKUETSU PAPER MILLS, LTD.) which was composed of boron-silica glass fibers rendered to be water repellent was processed as in Example 4 to prepare air purifying filter E1 which had only lysozyme left immobilized through covalent bonding.

Example 9

The procedure of Example 8 was repeated, except that the aqueous solution (S1) was replaced by an aqueous solution containing 1% protamine and 1% lysozyme. Thus, air purifying filter E2 was prepared that had only protamine and lysozyme left immobilized through covalent bonding.

Example 10

The procedure of Example 8 was repeated, except that the aqueous solution (S1) was replaced by an aqueous solution containing 0.2% glucan and 1% lysozyme. Thus, air purifying filter E3 was prepared that had only glucan and lysozyme left immobilized through covalent bonding.

Example 11

The procedure of Example 8 was repeated, except that the aqueous solution (S1) was replaced by an aqueous solution containing 1% protamine, 0.2% glucan and 1% lysozyme. Thus, air purifying filter E4 was prepared that had only protamine, glucan and lysozyme left immobilized through covalent bonding.

Comparative Example 8

The untreated filter paper-like carrier for use in a pseudo-HEPA filter which was used in Example 8 and composed of the boron-silica glass fibers rendered to be water repellent was designated as air purifying filter Ex.

Test 3

The amounts of residual protamine and/or lysozyme in the spent aqueous solution (S1A) resulting from the immobilization treatments in Examples 4, 5, 6 and 7, as well as the amounts of protamine and/or lysozyme eluted into the buffer solutions (S2A) used to wash the filer paper-like carriers after immobilization were measured with a protein assay kit of Bio-Rad Laboratories at wavelength of 595 nm using a spectrophotometer model UV-2100PC of Shimadzu Corp. The percent immobilization of protamine and/or lysozyme through covalent bonding to the prepared air purifying filters was calculated, and the results are shown in Table 7–11.

Test 4

A culture solution of Bacillus subtilis (ATCC 6633) cells (count: 1×10$^3$ cells/mL) was atomized at a flow rate of 0.1 mL per minute by means of high-purity carbon dioxide gas supplied from a liquefaction container at a flow rate of 20 L per minute, and the atomized gas was mixed with clean air supplied through a HEPA filter at a flow rate of 80 L per minute to thereby prepare a sample gas. The sample gas was introduced at a flow rate of 100 L per minute into an air-borne microorganism measuring apparatus fitted with an air purifying filter sample and an accelerated test was conducted to evaluate the filter's bactericidal performance, with the introduction time set at 2 hours or 24 hours. For the last one hour of each introduction time, 25% of the sample gas which was yet to pass through the air purifying filter sample and 25% of the sample gas which had passed through it were collected in the inflow and the outflow, respectively. Both the inflow and the outflow were diluted 600 folds and 10 mL of each dilution was transplanted in a culture medium and cultured aerobically at a temperature of 37° C. for 48 hours, and then the number of colonies (CO) from the inflow (prior to the passage through the air purifying filter sample) and the number of colonies (Cs) from the outflow (after the passage through the air purifying filter sample) were counted respectively and the percent residual microorganism cells (C) in the sample gas after the passage through the air purifying filter sample was determined for each of the test times by the following formula:

(Cs/SO)×100=C (%).

The results are shown in Tables 7–12.

Test 5

After the introduction of each sample gas in Test 4, clean air from the HEPA filter in place of the sample gas was introduced for one hour at a flow rate of 100 L per minute into the air-born cell measuring apparatus fitted with the air purifying filter sample; immediately thereafter, the air purifying filter sample was dismounted from the airborne-cell measuring apparatus; a section of size 1 cm$^2$ was taken from four sites of the air purifying filter sample, top, bottom, left, right, and center, each section was extracted and the resultant extract was directly transferred into a culture medium and cultured aerobically at a temperature of 37° C. for 48 hours; and thereafter, the number of colonies was counted at the five sites and the total was substituted for the number of viable cells in each 5 cm$^2$ area of the air purifying filter sample. The results for each test time are shown in Tables 7–12.

TABLE 7

| | Enzyme immobilization to filter, % | Residual cells in sample gas after passage through filter, % Sample gas (with contamination) Introduction Time, hour | | No. of viable cells on filter (cells/5 cm$^2$) Clean Air Sample gas Introduction Time (i.e., exposure time), hour | |
|---|---|---|---|---|---|
| | | 2 | 24 | 2 | 24 |
| Example 4 | 92 | <0.01 | <0.01 | <3 | <3 |
| Example 5 | 99 | <0.01 | <0.01 | <3 | <3 |
| Example 6 | 98 | <0.01 | <0.01 | <3 | <3 |
| Example 7 | 99 | <0.01 | <0.01 | <3 | <3 |
| Comparative Example 7 | — | 3.4 | 3.9 | >300 | >300 |
| Example 8 | 9 | 0.5 | 0.5 | 47 | >300 |
| Example 9 | 9 | 0.4 | 0.4 | 39 | >300 |
| Example 10 | 9 | 0.4 | 0.4 | 37 | >300 |
| Example 11 | 9 | 0.4 | 0.4 | 32 | >300 |
| Comparative Example 8 | — | 3.3 | 3.9 | >300 | >300 |

As is clear from the values of percent enzyme immobilization shown in Table 7, the air purifying filters D1, D2, D3 and D4 of Examples 4–7 employing the filter paper-like carrier for use in a pseudo-HEPA filter which was composed of boron-silica glass fibers not rendered to be water repellent featured at least 10 times more enzyme immobilization through covalent bonding than the air purifying filters E1, E2, E3 and E4 of Examples 8–11 which employed the filter paper-like carrier for use in a pseudo-HEPA filter which was composed of boron-silica glass fibers rendered to be water repellent. Thus, it was supported that the boron-silica glass fibers not rendered to be water repellent permitted high-volume enzyme immobilization through covalent bonding.

Table 7 also shows the data for the percent residual cells in the sample gas from the air purifying filter as determined in Test 4 using the air purifying filters D1–D4 and E1–E4 of Examples 4–11, as well as the air purifying filters Dx and Ex of Comparative Examples 7 and 8, respectively. As is clear from the values of percent residual cells, the air purifying cells Dx and Ex of Comparative Examples 7 and 8 which employed the filter paper-like carrier for use in a pseudo-HEPA filter which had no enzyme immobilized thereon exhibited reasonably high cell trapping performance; however, the air purifying filters E1–E4 of Examples 8–11 of the invention which employed the filter paper-like carrier for use in a pseudo-HEPA filter which was composed of the boron-silica glass fibers rendered to be water repellent showed about 8 times greater purification performance by killing organism cells. It was also supported that the air purifying filters D1–D4 of Examples 4–7 of the invention which employed the filter paper-like carrier for use in a pseudo-HEPA filter which was composed of the boron-silica glass fibers not rendered to be water repellent showed at least 300 times greater purification performance by killing organism cells.

Table 7 also gives data for the number of viable cells per 5 cm$^2$ on the air purifying filter as determined in Test 5 for the air purifying filters D1–D4, and E1–E4 of Examples 4–11, the air purifying filters as well as the air purifying filters Dx and Ex of Comparative Examples 7 and 8, respectively. As is clear from the values of viable cell count given in Table 7 for the air purifying filter after 2 hours supply of the sample gas, the air purifying filters Dx and Ex of Comparative Examples 7 and 8 which employed the filter paper-like carrier for a pseudo-HEPA filter which had no enzymes immobilized thereon lacked bactericidal purification performance and, hence, the trapped microorganism cells could not be effectively killed and many of them remained alive on the air purifying filter. In contrast, the air purifying filters E1–E4 of Examples 8–11 of the invention which were composed of the water-repellent boron-silica glass fibers having the enzyme immobilized thereon had at least 6 times greater purification performance by killing the microorganism cells captured on the air purifying filter than the air purifying filters Dx and Ex of Comparative Examples 7 and 8; in addition, the air purifying filters D1–D4 of Examples 4–7 of the invention which employed the filter paper-like carrier for a pseudo-HEPA filter which was composed of the non-water repellent boron-silica glass fibers which had the enzyme immobilized thereon had at least 100 times greater purification performance by killing the microorganism cells captured on the air purifying filter, verifying the rapid decrease in the number of cells captured on the air purifying filters. Further, the air purifying filters D1–D4 of the invention still maintained the bactericidal purification performance on the filters even after 24 hours of introduction of the sample gas, and it was thereby demonstrated that the microorganism cells retained on the air purifying filters could be controlled efficiently over a prolonged time.

The foregoing results of Tests 3–5 demonstrate: the air purifying filters of the invention having the enzyme immobilized thereon maintained high bactericidal purification performance by adsorbing microorganism cells and lysing their cell walls by means of the lysozyme immobilized through covalent bonding; and the immobilization of a large amount of lysozyme and the like effectively through covalent bonding contributed to maintaining even higher bactericidal purification performance over a prolonged time.

Figure 3:
Figure 4:
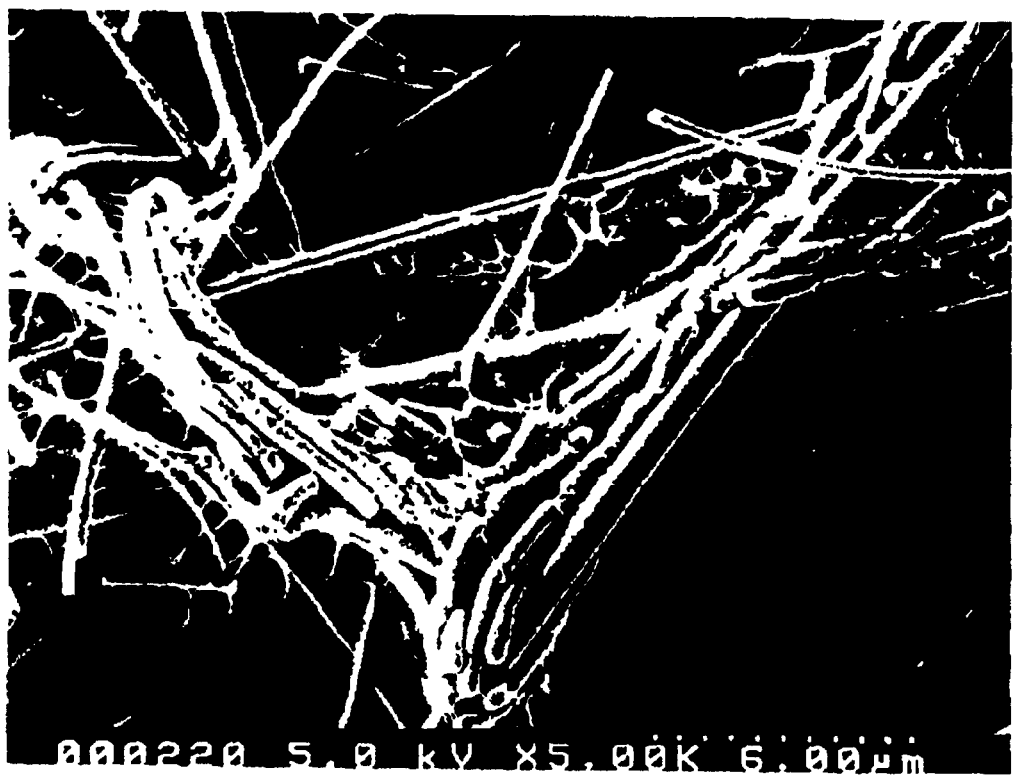

The state of the microorganism cells trapped by the air purifying filter D1 of Example 4 of the invention which had the enzyme immobilized thereon, and the state of the microorganism cells trapped by the prior art purifying filter Dx of Comparative Example 7 which had no enzymes immobilized thereon are shown in electron micrographs in FIGS. 3 and 4, respectively. The electron micrographs were taken with a scanning electron microscope model S-4000 of Hitachi, Ltd. at an acceleration voltage of 5 kV.

FIG. 3 shows direct lysis of the cell walls of Bacillus subtilis which was arrested by the air purifying filter which had lysozyme immobilized in accordance with the invention. On the other hand, FIG. 4 shows that the conventional air purifying filter which had no enzymes immobilized thereon was incapable of killing microorganism cells but it just left them as trapped. The two electron micrographs obviously show the difference between the states of trapped cells and it was supported that the enzyme immobilized on the air purifying filter caused a sufficient lysing action on the retained microorganism cells to remove them by killing or otherwise controlling them.

Example 12

A filter paper-like carrier for use in a pseudo-HEPA filter (product of HOKUETSU PAPER MILLS, LTD.) which was composed of boron-silica glass fibers not rendered to be water repellent and which had an arrest efficiency of at least 99% in a 0.3 µm monodisperse DOP test was immersed in a 100 mM phosphate buffer solution (pH 7) at room temperature for 30 minutes, recovered and had the excess water deposit removed. The filter paper-like carrier was then left in a 1% lysozyme containing aqueous solution (S3) at room temperature for 3 hours so as to immobilize the lysozyme on the filter paper-like carrier by an ionic bonding reaction. The filter paper-like carrier having the lysozyme immobilized thereon was further washed with a 100 mM phosphate buffer solution of pH 7 (S4); and upon air drying, the physical adsorption of the enzyme on the filter paper-like carrier was removed to leave only the lysozyme content that was immobilized through ionic bonding. The thus prepared filter was designated as air purifying filter F.

Comparative Example 9

The untreated filter paper-like carrier for use in a pseudo-HEPA filter which was used in Example 12 and which was composed of the boron-silica glass fibers not rendered to be water repellent was designated as air purifying filter Fx.

Test 6

The amount of residual lysozyme in the spent aqueous solution (S3A) resulting from the immobilization treatment by ionic bonding reaction in Example 12 and the amount of lysozyme eluted into the buffer solution (S4A) used to wash the filter paper-like carrier after immobilization were measured with a protein assay kit of Bio-Rad Laboratories at a wavelength of 595 nm using a spectrophotometer model UV-2100PC of Shimadzu Corp.; and the percent immobilization of protamine and/or lysozyme through covalent bonding to the prepared air purifying filter was calculated and the results are shown in Table 8.

TABLE 8

| | Ratio of enzyme binding to filter, % | Residual cells in sample gas after passage through filter, % Sample gas (with contamination) Introduction Time, hour | | No. of viable cells on filter (cells/5 cm²) Clean Air Sample gas Introduction Time (i.e., exposure time), hour | |
|---|---|---|---|---|---|
| | | 2 | 24 | 2 | 24 |
| Example 12 | 90 | <0.01 | <0.01 | <3 | <3 |
| Comp. Ex. 9 | — | 3.4 | 3.9 | >300 | >300 |

As is clear from the values of percent enzyme immobilization shown in Table 8, the air purifying filter F of Example 12 employing the filter paper-like carrier which was composed of the boron-silica glass fibers not rendered to be water repellent featured effective immobilization of high volume lysozyme although the binding force was ionic rather than covalency.

Table 8 shows the data for the percent residual cells in the gas from the air purifying filter as determined in Test 4 using the air purifying filters F and Fx of Example 12 and Comparative Example 9, respectively. As is clear from the values of percent residual cells, the air purifying filter F of Example 12 of the invention which employed the filter paper-like carrier for use in a pseudo-HEPA filter which was composed of the boron-silica glass fibers not rendered to be water repellent but which had lysozyme immobilized through ionic bonding showed at least about 300 times as great purification performance by killing organism cells as the air purifying filter Fx of Comparative Example 9.

Table 8 also shows the values of viable cell count per 5 cm² on the air purifying filters F and Fx of Example 12 and Comparative Example 9, respectively, as determined in Test 5 after 2 hours of the sample gas introduction. As is clear from the values of viable cell count shown in Table 8, the air purifying filter F of Example 12 of the invention which was composed of the boron-silica glass fibers not rendered to be water repellent exhibited at least 100 times as great purification performance by killing the trapped microorganism cells as the filter of Comparative Example 9. Thus, it was verified that microorganism cells decreased rapidly in number after they were retained on the air purifying filter F which had lysozyme immobilized through ionic bonding in accordance with the invention. Further, the air purifying filter F of the invention maintained the bactericidal purification performance on the test air purifying filter even after 24 hours introduction of the sample gas, thereby demonstrating that the microorganism cells retained on the air purifying filter could be controlled over a prolonged time.

The foregoing results of Tests 4, 5 and 6 demonstrate: the air purifying filter F of the invention which had lysozyme immobilized through ionic bonding could maintain as high bactericidal purification performance by adsorbing microorganism cells and lysing their cell walls as in the case of immobilization through the aforementioned covalent bonding; and immobilizing the large amount of lysozyme and the like effectively through ionic bonding contributed to the maintenance of even higher bactericidal purification performance over a prolonged time.

Example 13

A filter made of a nonwoven fabric of ion-exchange fibers having —NH₂ functional groups and an average diameter of 30 μm was immersed in a 100 mM phosphate buffer solution (pH 7) at room temperature for 30 minutes, recovered and had the excess water deposit removed. The resulting filter was immersed in a 2.5% aqueous glutaraldehyde solution at room temperature for one hour so as to introduce aldehyde groups into the nonwoven fabric filter made of ion-exchange fibers. The filter having the aldehyde groups introduced therein was further washed with a buffer solution (pH 7) prepared by mixing a 100 mM NaCl solution with a 100 mM acetic acid solution, and then the filter was left in an aqueous solution (S5) containing 1% polylysine and 1% lysozyme for 3 hours so that protamine and lysozyme were immobilized on the filter. The nonwoven fabric filter made of the ion-exchange fibers having both polylysine and lysozyme immobilized thereon was further washed with a buffer solution of pH 7 (S6) prepared by mixing a 100 mM NaCl solution with a 100 mM acetic acid solution; and upon air drying, the physical adsorption of the enzyme on the nonwoven fabric filter was removed to leave only the polylysine and lysozyme contents that were immobilized through covalent bonding. The thus prepared filter was designated as air purifying filter G.

Comparative Example 10

The untreated filter used in Example 13 which was made of a nonwoven fabric of ion-exchange fibers having —NH2 functional groups and an average diameter of 30 μm was designated as air purifying filter Gx.

Example 14

A filter made of a nonwoven fabric of ion-exchange fibers having —COOH functional groups and an average diameter of 30 μm was immersed in a 100 mM phosphate buffer solution (pH 7) at room temperature for 30 minutes, recovered and had the excess water deposit removed. The filter was then left in an aqueous solution (S7) containing 1% polylysine and 1% lysozyme for 3 hours at room temperature so that the polylysine and lysozyme were immobilized by an ionic bonding reaction. The nonwoven fabric filter made of the ion-exchange fibers having both polylysine and lysozyme immobilized thereon was further washed with a 100 mM phosphate buffer solution of pH 7 (S8); and upon air drying, the physical adsorption of the enzyme on the nonwoven fabric filter was removed to leave only the polylysine and lysozyme contents that were immobilized through covalent bonding. The thus prepared filter was designated as air purifying filter H.

Comparative Example 11

The untreated filter used in Example 14 which was made of a nonwoven fabric of ion-exchange fibers having —COOH functional groups and an average diameter of 30 μm was designated as air purifying filter Hx.

Test 7

The amounts of residual polylysine and lysozyme in the spent aqueous solutions (S5A and S7A) resulting from the immobilization treatment conducted by covalent bonding and ionic bonding reactions in Examples 13 and 14, respectively, as well as the amounts of polylysine and lysozyme eluted into the buffer solutions (S6A and S8A) used to wash the filter paper-like carriers after immobilization were measured with a protein assay kit of Bio-Rad Laboratories at a wavelength of 594 nm using a spectrophotometer model UV-2100PC of Shimadzu Corp.; and the percent immobilization of polylysine and lysozyme through covalent bonding or ionic bonding to the prepared air purifying filters was calculated and the results are shown in Table 9.

TABLE 9

| | Enzyme immobilization to filter, % | Residual cells in sample gas after passage through filter, % Sample gas (with contamination) Introduction Time, hour | | No. of viable cells on filter (cells /5 cm$^2$) Clean Air Sample gas Introduction Time (i.e., exposure time), hour | |
|---|---|---|---|---|---|
| | | 2 | 24 | 2 | 24 |
| Example 13 | 81 | 1.2 | 1.2 | <3 | <3 |
| Comp. Ex. 10 | — | 65 | 67 | >300 | >300 |
| Example 14 | 86 | 1.1 | 1.1 | <3 | <3 |
| Comp. Ex. 11 | — | 67 | 71 | >300 | >300 |

As is clear from Table 9, the air purifying filter G of Example 13 of the invention which was prepared from the nonwoven fabric of ion-exchange fibers having —NH2 functional groups and the air purifying filter H made from the nonwoven fabric of ion-exchange fibers having —COOH functional groups and an average diameter of 30 μm had large amounts of polylysine and lysozyme immobilized through effective bonding.

Table 9 also shows the data for percent residual cells in the gas from the air purifying filter as measured in Test 4 (accelerated test to evaluate bactericidal performance) using air purifying filters G and H of Examples 13 and 14, as well as air purifying filters Gx and Hx of Comparative Examples 10 and 11. As is clear from the values of percent residual cells in the gas from the air purifying filter, the air purifying filter G and H of Examples 13 and 14 of the invention which were prepared from the nonwoven fabrics of ion-exchange fibers having functional groups to which lysozyme and the like were immobilized through covalent bonding or ionic bonding exhibited far superior purification performance by killing microorganism cells as compared to the air purifying filters Gx and Hx of Comparative Examples 10 and 11 which were prepared from the nonwoven fabrics of ion-exchange fibers having functional groups but which had no enzymes immobilized thereon.

Table 9 also gives data for the number of viable cells per 5 cm$^2$ on the test air purifying filter as determined in Test 5 for the air purifying filters G and H of Examples 13 and 14, as well as the air purifying filters Gx and Hx of Comparative Examples 10 and 11 after 2 hours of the sample gas introduction. As is clear from the values of viable cell count shown in Table 9, the air purifying filters G and H of Examples 13 and 14 of the invention which were prepared from the nonwoven fabrics of ion-exchange fibers having polylysine and lysozyme immobilized uniformly also excelled in purification performance by killing or otherwise controlling the microorganism cells trapped on the filter. Further, the air purifying filters G and H of the invention maintained the bactericidal purification performance on the test air purifying filters even after 24 hours of the sample gas introduction, and thereby it was demonstrated that the microorganism cells retained on the filters could be controlled over a prolonged time.

The foregoing results of Tests 4, 5 and 7 demonstrate: the air purifying filters G and H of the invention maintained high bactericidal purification performance by adsorbing microorganism cells and lysing their cell walls by means of the lysozyme and the like which were immobilized through covalent bonding and/or ionic bonding; and the immobilization of the large amount of lysozyme and the like effectively through covalent bonding and/or ionic bonding contributed to the maintenance of even higher bactericidal purification performance over a prolonged time.

Comparative Example 12

A filter paper-like carrier for use in a pseudo-HEPA filter (product of HOKUETSU PAPER MILLS, LTD.) which was composed of boron-silica glass fibers not rendered to be water repellent and which had an arrest efficiency of at least 99% in a 0.3 µm monodisperse DOP test was immersed at room temperature for 30 min in an aqueous solution prepared by diluting a 50% aqueous polyitaconic acid solution (product of Iwata Kagaku Kogyo K.K.) 10 folds with water, and thereafter the carrier was recovered and had the excess water deposit removed. The excess water-free carrier was then dried for one hour in a dryer held at a temperature of 60° C. The thus prepared filter was designated as air purifying filter Ix. Identification of the prepared air purifying filter Ix with an electron microscope model JSM-5300 of JEOL LTD. and a Fourier-transformer spectrophotometer model JIR-WINSPEC 50 of JEOL LTD. verified uniform coating thereon with a polymer having -COOH functional groups.

Example 15

The air purifying filter Ix prepared in Comparative Example 12 with a uniform coat of the polymer having —COOH functional groups was immersed in a 100 mM phosphate buffer solution (pH 7) at room temperature for 30 minutes, and thereafter recovered and had the excess water deposit removed. The resulting air purifying filter Ix which was coated uniformly with the polymer having —COOH functional groups was left in an aqueous solution (S9) containing 0.5% lysozyme and 0.5% chitinase for 3 hours at room temperature so that both lysozyme and chitinase were immobilized by an ionic bonding reaction. The air purifying filter having the lysozyme and chitinase immobilized thereon was further washed with a 100 mM phosphate buffer solution of pH 7 (S10); and upon air drying, the physical adsorption of the enzymes on the filter paper-like carrier was removed to leave only the lysozyme and chitinase contents that were immobilized through ionic bonding. The thus prepared filter was designated as air purifying filter I.

Comparative Example 13

A filter paper-like carrier for use in a pseudo-HEPA filter (product of HOKUETSU PAPER MILLS, LTD.) which was composed of boron-silica glass fibers not rendered to be water repellent and which had an arrest efficiency of at least 99% in a 0.3 µm monodisperse DOP test was immersed at room temperature for 30 minutes in an aqueous solution prepared by diluting a 50% aqueous polyallylamine (product of NITTO BOSEKI CO., LTD.) 10 folds with water, and thereafter was recovered and had the excess water deposit removed. The excess water-free carrier was then dried for one hour in a dryer held at a temperature of 60° C. The thus prepared filter was designated as air purifying filter Jx. Identification of the prepared air purifying filter Jx with an electron microscope model JSM-5300 of JEOL LTD. and a Fourier-transformer spectrophotometer model JIR-WINSCPEC 50 of JEOL LTD. verified uniform coating thereon with a polymer having —$NH_2$ functional groups.

Example 16

The air purifying filter Jx prepared in Comparative Example 13 with a uniform coat of the polymer having —$NH_2$ functional groups was immersed in a 500 mM phosphate buffer solution (pH 7) at room temperature for 30 minutes and subsequently immersed in a 2.5% aqueous glutaraldehyde solution at room temperature for one hour so that aldehyde groups were introduced into the air purifying filter Jx uniformly coated with the polymer having —$NH_2$ functional groups. The air purifying filter uniformly coated with the polymer having —$NH_2$ functional groups into which aldehyde groups were introduced was further washed with a buffer solution (pH 7) prepared by mixing a 500 mM NaCl solution with a 500 mM acetic acid solution; and thereafter the filter was left for 3 hours in an aqueous solution (S11) containing 0.5% lysozyme and 0.5% chitinase so that both the lysozyme and chitinase were immobilized on the filter. The air purifying filter uniformly coated with the polymer having —$NH_2$ functional groups into which aldehyde groups were introduced and which had lysozyme and chitinase immobilized thereon was further washed with a buffer solution (S12) of pH 7 prepared by mixing a 500 mM NaCl solution and a 500 mM acetic acid solution; and upon air drying, the physical adsorption of the enzymes on the air purifying filter uniformly coated with the polymer having —$NH_2$ functional groups into which aldehyde groups were introduced was removed to leave only the lysozyme and chitinase contents that were immobilized through covalent bonding. The thus prepared filter was designated as air purifying filter J.

Test 8

The amounts of residual lysozyme and chitinase in the spent aqueous solutions (S9A and S11A) resulting from the immobilization treatments conducted through ionic bonding and covalent bonding in Examples 15 and 16, respectively, as well as the amounts of lysozyme and chitinase eluted into the buffer solutions (S10A and S11A) used to wash the filter paper-like carriers after immobilization were measured with a protein assay kit of Bio-Rad Laboratories at a wavelength of 595 nm using a spectrophotometer model UV-2100PC of Shimadzu Corp.; and the percent immobilization of lysozyme and chitinase through ionic bonding and/or covalent bonding to the prepared air purifying filters were calculated and the results are shown in Table 10.

TABLE 10

| | Enzyme immobilization to filter, % | Residual cells in sample gas after passage through filter, % Sample gas (with contamination) Introduction Time, hour | | No. of viable cells on filter (cells /5 $cm^2$) Clean Air Sample gas Introduction Time (i.e., exposure time), hour | |
|---|---|---|---|---|---|
| | | 2 | 24 | 2 | 24 |
| Example 15 | 92 | <0.01 | <0.01 | <3 | <3 |
| Comp. Ex. 12 | — | 63 | 66 | >300 | >300 |
| Example 16 | 91 | <0.01 | <0.01 | <3 | <3 |
| Comp. Ex. 13 | — | 65 | 68 | >300 | >300 |

As is clear from Table 10, the air purifying filter I of Example 15 of the invention which was prepared from the filter paper-like carrier with a uniform coating of the polymer having —COOH functional groups and the air purifying filter J of Example 16 which was prepared from the filter paper-like carrier with a uniform coating of the polymer having —NH2 functional groups had large amounts of lysozyme and chitinase immobilized through uniform bonding.

Table 10 also shows the data for percent residual cells in the gas from the air purifying filter as measured in Test 4 (accelerated test to evaluate bactericidal performance) using the air purifying filters I and J of Examples 15 and 16, as well as the air purifying filters Ix and Jx of Comparative Examples 12 and 13. As is clear from the values of percent residual cells in the gas from the air purifying filter, the air purifying filters I and J of Examples 15 and 16 of the invention which were prepared from the filter paper-like carriers with a uniform coating of the polymer having functional groups to which lysozyme and chitinase were immobilized through ionic bonding and covalent bonding exhibited far superior purification performance by killing organism cells as compared to the air purifying filters Ix and Jx of Comparative Examples 12 and 13 which were prepared from the filter paper-like carriers with a uniform coating of the polymer having functional groups but which had no enzymes immobilized thereon.

Table 10 also gives data for the number of viable cells per 5 cm$^2$ on the test air purifying filter as determined in Test 5 for air purifying filters I and J of Examples 15 and 16, as well as air purifying filters Ix and Jx of Comparative Examples 12 and 13 after 2 h of sample gas introduction. As is clear from the values of viable cell count shown in table 10, the air purifying filters I and J of Examples 15 and 16 of the invention which were prepared from the filter paper-like carriers having a uniform polymer coat with lysozyme and chitinase immobilized uniformly thereon also excelled in purification performance by killing or otherwise controlling the microorganism cells trapped on the filter. Further, the air purifying filters I and J of the invention maintained the bactericidal purification performance on the filters even after 24 hours of the sample gas introduction, and thereby it was demonstrated that the microorganism cells retained on the filters could be controlled over a prolonged time.

The foregoing results of Tests 4, 5 and 8 demonstrate: the air purifying filters I and J of the invention maintained high bactericidal purification performance by adsorbing microorganism cells and lysing their walls by means of the lysozyme and the like which were immobilized through covalent bonding and/or ionic bonding; and the immobilization of the large amount of lysozyme and the like effectively through covalent bonding and/or ionic bonding contributed to the maintenance of even higher bactericidal purification performance over a prolonged time.

Test 9

As in Tests 4 and 5, the number of viable cells in each 5 cm$^2$ area of the test air purifying filter was determined at 2 hours intervals for an expanded microorganism spectrum including not only *Bacillus subtilis* (ATCC 6633) but also *Micrococcus luteus* (ATCC 9341), *Staphylococcus aureus* (IFO 13276), *Escherichia coli* (ATCC 10536), *Vibrio parahaemolyticus* (IFT 12970) and a blue mold (*Penicillium roqueforti*, IFO 5459). The results are shown in Table 11.

TABLE 11

Bactericidal Test on Various Microorganisms

| | Comp. Ex. 7 | Ex. 4 | Ex. 5 | Ex. 6 | Ex. 7 |
|---|---|---|---|---|---|
| * Gram-positive organisms | | | | | |
| *Bacillus subtilis* ATCC 6633 | >300 | 3 | 3 | 3 | 3 |
| *Micrococcus luteus* ATCC 9341 | >300 | 3 | 3 | 3 | 3 |
| *Staphylococcus aureus* IFO 13276 | >300 | 3 | 3 | 3 | 3 |
| * Gram-negative organisms | | | | | |
| *Escherichia coli* ATCC 10536 | >300 | 1 | 3 | 5 | 3 |
| *Vibrio parahaemolyticus* IFO 12970 | >300 | 8 | | 3 | 3 |
| * Mold | | | | | |
| *Penicillium roqueforti* IFO 5459 | >300 | 8 | 3 | 3 | 3 |

(Notes)
Comparative Example 7 (Dx): Filter alone
Example 4 (D1): Lysozyme immobilized on filter
Example 5 (D2): Lysozyme + protamine immobilized on filter
Example 6 (D3): Lysozyme + glucan immobilized on filter
Example 7 (D4): Lysozyme + protamine + glucan immobilized on filter As is clear from Table 11, the air purifying filter D2 of Example 5 having lysozyme immobilized in combination with protamine, the air purifying filter D3 of Example 6 having lysozyme immobilized in combination with glucan and the air purifying filter D4 of Example 7 having lysozyme immobilized in combination with protamine and glucan had an enhanced bactericidal effect against Gram-negative *Escherichia coli* and *Vibrio parahaemolyticus* and a mold *Penicillium roqueforti* compared to D1 of Example 4 which had only lysozyme immobilized on the filter. Briefly, it was supported that by using bactericidal enzymes in combination with either non-enzyme proteins or peptides also having a bactericidal action or with polysaccharides, the ability of the filter to purify air by killing or otherwise controlling microorganisms can be enhanced in terms of the wider lysing spectrum.

INDUSTRIAL APPLICABILITY

The air purifying filter described above is capable of an efficient adsorption of air-borne bacteria, fungi and other microorganisms that have been impossible to remove by the conventional filters, and a high bactericidal purification performance by killing the microorganisms through direct lysis of their cell walls, as well as prolonged bactericidal purification of air. In addition, the filter is capable of removing the retained organism cells by killing or otherwise controlling them so that they will not regrow to thereby prevent the microbial deterioration of the filter carrier and secondary contamination due to the scattering of the organism cells. For removing microorganisms in food, cosmetic, microelectronics, medical and other fields, there is no alternative to using ULPA and HEPA filters which are ultrahigh- and high-performance filters primarily intended for removing fine dust particles and which hence require huge electrical energy consumption to compensate for large pressure loss from air supply. If the air purifying filter of the invention is used as a filter element, a low-pressure loss filter downgraded by several classes can be realized and it can be used as a low environmental impact filter requiring no more than a fraction of the heretofore required electrical energy consumption.

An air purifying filter also can be fabricated that uses one or more enzyme that have been modified to improve the bonding or immobilization of the enzyme to a carrier that has not been rendered water repellent prior to immobilization. In general, the bonding between the modified enzyme and the carrier is covalent. Representative examples of the modified enzyme air purifying filter are described below.

Modified Enzyme Example 1

100 g of a filter paper carrier used in a HEPA filter of HOKUETSU PAPER MILLS, LTD. (sold under the trade name: L-28 HEPA Grade ) was used in Modified Enzyme Example 1. The filter paper carrier was composed of boron-silica glass fibers that had not been rendered to be water repellent and which had an arrest efficiency of at least 99.97% as measured in a 0.3 μm monodisperse DOP test. The filter paper carrier was initially immersed in 1.5 liter of an aqueous solution (SX1) of 1 wt. % β-1,3-glucanase substituted acetyl cellulose bromide at a temperature of 40° C. for two minutes to immobilize the β-1,3-glucanase substituted acetyl cellulose bromide on the surface of the filter paper carrier through covalent bonding. The treated filter paper carrier was removed from the solution and allowed to air drain off the resultant solution. The treated filter paper carrier then was air dried at a temperature of 160° C. for three minutes to produce a completely immobilized filter paper carrier. The resulting filter paper carrier having the β-1,3-glucanase immobilized thereon was washed with a pH 7 buffer solution (SY1) prepared by mixing a 500 mM NaCl solution with a 500 mM acetic acid solution. The filter paper carrier then was air dried at a temperature of 110° C. and the physically adsorbed enzyme on the filter paper carrier was removed to leave only the β-1,3-glucanase content that was immobilized to the carrier through covalent bonding. The thus prepared air purifying filter was designated A.

The percent immobilization of the modified enzyme binding to the filter was calculated as described above. Namely, as described above, the amount of residual modified enzyme in the spent aqueous solution resulting from the immobilization treatment (Solution SX1), as well as the amount of modified enzyme eluted into the solution used to wash the carrier after immobilization were measured (Solution SY1), for example, with a protein assay kit of Bio-Rad Laboratories at a wavelength of 594 nm using a spectrophotometer model UV-2100PC of Shimadzu Corp. The resulting data was used to calculate the percent immobilization of the modified enzyme. Although SX1 and SY1 are specific to Modified Enzyme Example 1, the corresponding solutions in the examples described below were used in the same manner to calculate percent immobilization in those examples. Furthermore, in the calculation of the percent immobilization SX1, and the corresponding solutions described below, refer to the solution after the carrier has been immersed in the solution and removed. Similarly, SY1 and the corresponding solutions described below refer to the solution after the carrier has been washed in the solution.

Of course, the percentage immobilization calculated is based on the use of a 1 wt. % β-1,3-glucanase substituted acetyl cellulose bromide solution and is expected to vary based on variables, such as the immersion time and the strength of the solution. Thus, the actual amount of immobilized enzyme on the carrier can be expected to be increased or reduced based on these variables. In fact, experiments have shown that, with a constant immersion time, at least 99% immobilization is achieved when the solution has a concentration of approximately 1% or more of the immobilized enzyme. Thus, a theoretical maximum appears to be attained at a concentration of approximately 1% modified enzyme.

Modified Enzyme Example 2

The procedure of Modified Enzyme Example 1 was repeated, except that the aqueous solution (SX2) was replaced by an aqueous solution containing 1 wt. % lysozyme substituted acetyl cellulose bromide. As described above with respect to Modified Enzyme Example 1, the treated filter paper was washed with a pH 7 buffer solution. (SY2). Thus, an air purifying filter B was prepared such that it had only the lysozyme left immobilized to the carrier through covalent bonding.

Modified Enzyme Example 3

The procedure of Modified Enzyme Example 1 was repeated, except that the aqueous solution (SX3) was replaced by an aqueous solution containing 1 wt. % neutral protease substituted acetyl cellulose bromide. As described above with respect to Modified Enzyme Example 1, the treated filter paper was washed with a pH 7 buffer solution. (SY3). Thus, an air purifying filter C was prepared such that it had only the neutral protease left immobilized to the carrier through covalent bonding.

Modified Enzyme Example 4

The procedure of Modified Enzyme Example 1 was repeated, except that the aqueous solution (SX4) was replaced by an aqueous solution containing 1.2 wt. % β-1,3-glucanase combined with protamine compound substituted acetyl cellulose bromide. As described above with respect to Modified Enzyme Example 1, the treated filter paper was washed with a pH 7 buffer solution. (SY4). Thus, an air purifying filter D was prepared such that it had only the β-1,3-glucanase combined with protamine compound substituted acetyl cellulose bromide left immobilized to the carrier through covalent bonding.

Modified Enzyme Example 5

The procedure of Modified Enzyme Example 1 was repeated, except that the aqueous solution (SX5) was replaced by an aqueous solution prepared by mixing 500 ml of 1 wt. % β1,3-glucanase substituted acetyl cellulose bromide, 500 ml of 1 wt. % lysozyme substituted acetyl cellulose bromide, and 500 ml of 1 wt. % neutral protease substituted acetyl cellulose bromide to form 1.5 liters of an aqueous solution. As described above with respect to Modified Enzyme Example 1, the treated filter paper was washed with a pH 7 buffer solution. (SY5). Thus, an air purifying filter E was prepared that had only β-1,3-glucanase substituted acetyl cellulose bromide, lysozyme substituted acetyl cellulose bromide, and neutral protease substituted acetyl cellulose bromide compound left immobilized to the carrier through covalent bonding.

Although only one example of a mixture of modified enzymes was described in detail herein, many other combinations are possible. For example, any combination of one or more of the modified enzymes described in Modified Enzyme Examples 1–5 may be implemented in the air purifying filter. In general, the modified enzyme is modified by a compound that improves the covalent bonding of the modified enzyme to the carrier. The compound, generally known as a bonding agent or a bridging agent, reacts with the enzyme, and that portion of the bonding agent that is bonded to the enzyme covalently bonds to the carrier.

Comparative Example 1

An air purifying filter X was prepared with the filter paper carrier used in a HEPA filter of HOKUETSU PAPER MILLS, LTD. (sold under the trade name: L-28 HEPA Grade) and which was the same filter paper carrier used in Modified Enzyme Example 1. The air purifying filter X did not include either an enzyme or a modified enzyme immobilized on its surface.

Comparative Example 2

The procedure of Modified Enzyme Example 1 was repeated, except that a filter paper carrier used in a HEPA filter of HOKUETSU PAPER MILLS, LTD. (sold under the trade name: L-28 HEPA Grade), which was composed of boron-silica glass fibers not rendered to be water repellent, was replaced by boron-silica glass fibers that had been rendered to be water repellent Thus, an air purifying filter Y was prepared.

Comparative Example 3

The procedure of Modified Enzyme Example 1 was repeated, except that the aqueous solution (SX1) was replaced by an aqueous solution containing 1 wt. % β-1,3-glucanase. Thus, an air purifying filter Za was prepared that had only β-1,3-glucanase left immobilized through physical bonding. Because of the enzyme was not a modified enzyme that had been modified to improve the covalent bonding of the enzyme, the enzyme was bonded or immobilized to the air purifying filter (i.e., the carrier) by physical bonding.

Comparative Example 4

The procedure of Modified Enzyme Example 1 was repeated, except that the aqueous solution (SX1) was replaced by an aqueous solution containing 1 wt. % lysozyme. Thus, an air purifying filter Zb was prepared that had only lysozyme left immobilized through physical bonding.

Comparative Example 5

The procedure of Modified Enzyme Example 1 was repeated, except that the aqueous solution (SX1) was replaced by an aqueous solution containing 1 wt. % neutral protease. Thus, an air purifying filter Zc was prepared that had only neutral protease left immobilized through physical bonding.

Comparative Example 6

The procedure of Modified Enzyme Example 1 was repeated, except that the aqueous solution (SX1) was replaced by an aqueous solution containing 1.2 wt. % β-1,3-glucanase combined with protamine compound. Thus, an air purifying filter Zd was prepared that had only β1,3-glucanase combined with protamine compound left immobilized through physical bonding.

Comparative Example 7

The procedure of Modified Enzyme Example 1 was repeated, except that the aqueous solution (SX1) was replaced by an aqueous solution containing equal parts of 1 wt. % lysozyme, 1 wt. % neutral protease, and 1.2 wt. % β-1,3-glucanase combined with protamine compound. Thus, an air purifying filter Ze was prepared that had only lysozyme, neutral protease, and β-1,3-glucanase combined with protamine compound left immobilized through physical bonding.

TABLE 12

| | Enzyme binding to filter, % | Residual cells in sample gas after passage through filter, % Sample gas (with contamination) Introduction Time, hour | | No. of viable cells on filter (cells /5 cm$^2$) Clean Air Sample gas Introduction Time (i.e., exposure time), hour | |
|---|---|---|---|---|---|
| | | 2 | 24 | 2 | 24 |
| Example 1 | >99 | <0.01 | <0.01 | <3 | <3 |
| Example 2 | >99 | <0.01 | <0.01 | <3 | <3 |
| Example 3 | >99 | <0.01 | <0.01 | <3 | <3 |
| Example 4 | >99 | <0.01 | <0.01 | <3 | <3 |
| Example 5 | >99 | <0.01 | <0.01 | <3 | <3 |
| Comparative Example 1 | — | <0.01 | <0.01 | >300 | >300 |
| Comparative Example 2 | — | <0.01 | <0.01 | >300 | >300 |
| Comparative Example 3 | <3 | <0.01 | <0.01 | >300 | >300 |
| Comparative Example 4 | <2 | <0.01 | <0.01 | >300 | >300 |
| Comparative Example 5 | <3 | <0.01 | <0.01 | >300 | >300 |
| Comparative Example 6 | <3 | <0.01 | <0.01 | >300 | >300 |
| Comparative Example 7 | <2 | <0.01 | <0.01 | >300 | >300 |

As can be seen in Table 12, the amount of modified enzyme binding to the filter is greater than 90 percent, approximately 99 percent, and more particularly greater than 99 percent, based on the calculation technique and immobilization method described above. In contrast, Table 12 illustrates that the comparative examples, in which a modified enzyme is not used, has an enzyme immobilization binding to the filter of less than 3 percent in each instance. The most striking result is the amount of viable cells remaining on the filter after six and forty eight hours of exposure of the cells to the filter. As also can be seen in Table 12, the filter with the modified enzyme immobilized on the carrier had no viable cells remaining at these times whereas the other filters had a significantly large amount of viable cells remaining on the filter in each instance.

Figure 5:
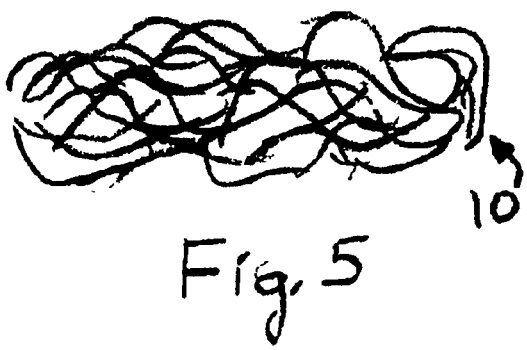
Figure 6:
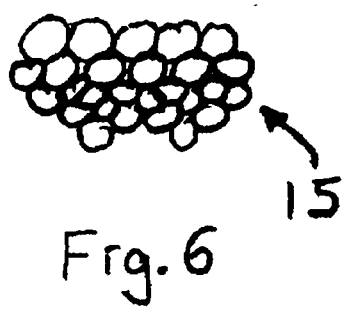
Figure 7:
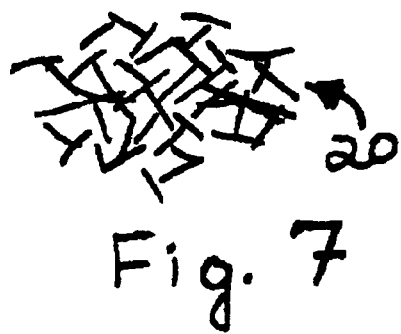
Figure 8:
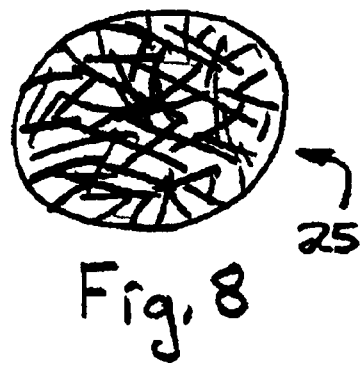
Figure 9:
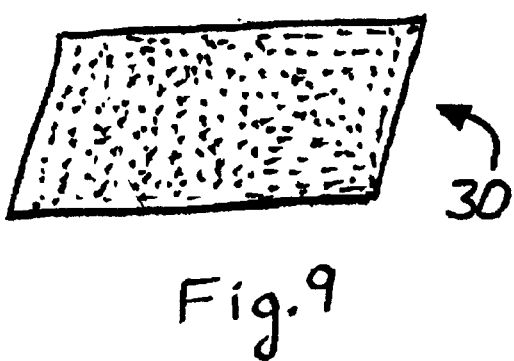
Figure 10:
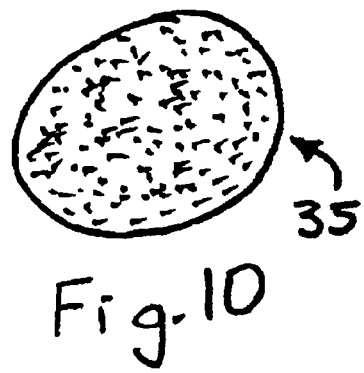

In general, the filter having a modified enzyme as described herein, the method of making the filter, and the method of using the filter can be implemented in many configurations. For example, referring to FIGS. 5–10, the purifying filter and/or the carrier can be implemented as a filter that resembles or is shaped like one or more of the following: a cotton carrier 10 (FIG. 5), a honeycomb carrier 15 (FIG. 6), a fiber carrier 20 (FIG. 7), a filter paper carrier 25 (FIG. 8), a screen carrier 30 (FIG. 9), and/or a particulate carrier 35 (FIG. 10).

The carrier can be fabricated from one or more fibers, such as glass fibers, including boron-silica glass fibers, cellulose fibers, including rayon fibers, and ion exchange fibers. One or more of these types of fibers can be used to make the carrier. Any of these fibers can be coated with a polymer having a functional group. The functional group improves the bonding of the modified enzyme to the carrier (e.g., the fibers). Examples of the functional groups of the polymer coating includes one or more of: NHR (R is not H but an alkyl group selected from among methyl, ethyl, propyl and butyl), —NH$_2$, —C$_6$H$_5$NH$_2$, —COOH and —OH. The modified enzyme bonds to the functional group of the polymer. For example, the bonding agent that is bonded to the enzyme bonds to the functional group of the polymer that is coated to the fibers. The bond is in general a covalent bond. The modified enzyme is either of a single type or a system consisting of two or more types, or it forms a mixture or a compound with a non-enzyme protein, a peptide, and/or a polysaccharide. The modified enzyme may be at least one or more lysing enzymes selected from among lysozyme, chitinase, protease, glucose oxidase, glucanase, β-galactosidase, endo-β-N-acetylgluco-saminidase and endolysin. The non-enzyme protein is one or more bactericidal proteins or peptides selected from among protamine, lactoferrin and polylysine, and the polysaccharide is one or more of glucan, dextran, mannan, galactomannan, laminaran, carrageenan and agarose. Examples of the modified enzyme include:

(1) an enzyme bonded with bromine-N-substituted carbamate;

(2) an enzyme bonded with bromine-N-substituted imido carbonate;

(3) an enzyme bonded with acetyl cellulose bromide;

(4) an enzyme N substituted isourea bromide having the formula of $$Br-\overset{NH}{\underset{\|}{C}}-NH-Enzyme;$$

(5) an enzyme N substituted imidocarbonyl dibromide having the formula of $$Br-\overset{Br}{\underset{|}{C}}=N-Enzyme;$$

(6) an enzyme N substituted carbamyl bromide having the formula of $$Br-\overset{O}{\underset{\|}{C}}-NH-Enzyme;$$

(7) an enzyme substituted acetyl cellulose bromide having the formula of $$Br-\overset{O}{\underset{\|}{C}}-CH_2-Enzyme;$$

(8) an enzyme N substituted glutal aldehyde having the formula of $$H-\overset{O}{\underset{\|}{C}}-(CH_2)_3-CH_2-NH-Enzyme; \text{ and}$$

(9) a mixture of any one or more of the above compounds including, for example, β-1,3-glucanase substituted acetyl cellulose bromide, lysozyme substituted acetyl cellulose bromide, and neutral protease substituted acetyl cellulose bromide.

The air purifying filter described above has great industrial utility and applicability. For example, the air purifying filter may be used to purify air of Staphylococcus, including *S. aureus* and *S. epidermidis*; Micrococcus, including *M. luteus*; Streptococcus, including *S. pyogenes; Bacillus,* including *B. subtilis, B. cereus,* and *B. anthracis*; Clostridiun, including *C. botulinum* and *C. tetani*; Lactobacillus, including *L. burugaricus*; Corynebacterium, including *C. diphtheriae*; and Mycobacterium, including *M. bovis* and *M. tubercuiosis.*

Referring to FIG. 11, the air purifying filter is fabricated in a process 100 by providing a carrier that has not been rendered to be water repellant (step 105); providing an enzyme that has been modified with a bonding agent that improves the bonding to the carrier (step 110); and immobilizing the enzyme on a surface of the carrier (step 115). The carrier is made from one or more fibers, and the bonding of the modified enzyme to the carrier is covalent bonding. The modified enzyme includes any or more of the modified enzymes as described above.

The resulting air purifying filter may be installed in an air handling system, such as any building air handling system, including an office building; in a personal use air filter; in a semiconductor-related or hospital-related facility, in a biologic, medical device, pharmaceutical, and/or cosmetic manufacturing facility, and/or in a postal or other correspondence handling facility. Passing air through the air purifying filter can purify the air of one or more of Staphylococcus, including *S. aureus* and *S. epidermidis*; Micrococcus, including *M. luteus*; Streptococcus, including *S. pyogenes*; Bacillus, including *B. subtilis, B. cereus,* and *B. anthracis*; Clostridium, including *C. botulinum* and *C. tetani*; Lactobacillus, including *L. burugaricus*; Corynebacterium, including *C. diphtheriae*; and Mycobacterium, including *M. bovis* and *M. tubercuiosis.*

A number of embodiments of the air purifying have been described. Nevertheless, it will be understood that various modifications may be made without departing from the spirit and scope of the invention. Accordingly, other embodiments are within the scope of the following claims.

What is claimed is:

1. An air purifying filter comprising a modified enzyme immobilized on a surface of a carrier, wherein:
   the modified enzyme has been modified with a bonding agent that improves bonding;
   the surface of the carrier has not been rendered to be water repellant prior to immobilizing the modified enzyme on the surface of the carrier; and
   the bonding agent improves bonding of the modified enzyme to the carrier.

2. The air purifying filter according to claim 1, wherein the bonding comprises covalent bonding.

3. The air purifying filter according to claim 1, wherein the carrier comprises one or more fibers.

4. The air purifying filter according to claim 1, wherein the carrier comprises glass fibers.

5. The air purifying filter according to claim 4, wherein the glass fibers comprise boron-silica glass fibers.

6. The air purifying filter according to claim 1, wherein the carrier comprises cellulose fibers.

7. The air purifying filter according to claim 6, wherein the cellulose fibers comprise rayon.

8. The air purifying filter according to claim 1, wherein the carrier comprises ion-exchange fibers.

9. The air purifying filter according to claim 3, wherein the fibers are coated with a polymer having a functional group.

10. The air purifying filter according to claim 9, wherein the polymer having a functional group is a polymer having at least one functional group selected from among —NHR (R is not H but an alkyl group selected from among methyl, ethyl, propyl and butyl), —NH$_2$, —C$_6$H$_5$NH$_2$, —COOH and —OH.

11. The air purifying filter according to claim 9, wherein the modified enzyme bonds to the functional group of the polymer.

12. The air purifying filter according to claim 1, wherein the filter comprises a HEPA filter.

13. The air purifying filter according to claim 1, wherein the modified enzyme is immobilized through covalent bonding.

14. The air purifying filter according to claim 1, wherein the modified enzyme is either of a single type or a system consisting of two or more types, or it forms a mixture or a compound with a non-enzyme protein, a peptide, and/or a polysaccharide.

15. The air purifying filter according to claim 14, wherein the modified enzyme is at least one lysing enzyme selected from among lysozyme, chitinase, protease, glucose oxidase, glucanase, β-galactosidase, endo-β-N-acetylglucosaminidase and endolysin.

16. The air purifying filter according to claim 14, wherein the non-enzyme protein or peptide is either one bactericidal protein or peptide selected from among protamine, lactoferrin and polylysine.

17. The air purifying filter according to claim 14, wherein the polysaccharide is either one of glucan, dextran, mannan, galactomannan, laminaran, carrageenan and agarose.

18. The air purifying filter according to claim 1, wherein the modified enzyme comprises an enzyme bonded with bromine-N-substituted carbamate.

19. The air purifying filter according to claim 1, wherein the modified enzyme comprises an enzyme bonded with bromine-N-substituted imido carbonate.

20. The air purifying filter according to claim 1, wherein the modified enzyme comprises an enzyme bonded with acetyl cellulose bromide.

21. The air purifying filter according to claim 1, wherein the modified enzyme comprises an enzyme N substituted isourea bromide having the formula of

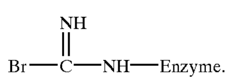

22. The air purifying filter according to claim 1, wherein the modified enzyme comprises an enzyme N substituted imidocarbonyl dibromide having the formula of

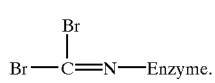

23. The air purifying filter according to claim 1, wherein the modified enzyme comprises an enzyme N substituted carbamyl bromide having the formula of

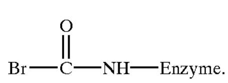

24. The air purifying filter according to claim 1, wherein the modified enzyme comprises an enzyme substituted acetyl cellulose having the formula of

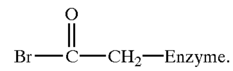

25. The air purifying filter according to claim 1, wherein the modified enzyme comprises an enzyme N substituted glutal aldehyde having the formula of

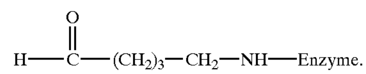

26. The air purifying filter according to claim 1, wherein the enzyme comprises a mixture of β-1,3-glucanase substituted acetyl cellulose bromide, lysozyme substituted acetyl cellulose bromide, and neutral protease substituted acetyl cellulose bromide.

27. A method of fabricating an air purifying filter, the method comprising:

providing a carrier that has not been rendered to be water repellant;

providing an enzyme that has been modified with a bonding agent that improves the bonding to the carrier; and immobilizing the enzyme on a surface of the carrier.

28. The method according to claim 27, wherein the carrier comprises one or more fibers.

29. The method according to claim 27, wherein the bonding comprises covalent bonding.

30. The method according to claim 27, wherein the enzyme comprises a mixture of β-1,3-glucanase substituted acetyl cellulose bromide, lysozyme substituted acetyl cellulose bromide, and neutral protease substituted acetyl cellulose bromide.

31. A method of purifying air comprising:

providing an air filter comprising a modified enzyme immobilized on a surface of a carrier, wherein the modified enzyme has been modified with a bonding agent that improves bonding, the surface of the carrier has not been rendered to be water repellant prior to immobilizing the modified enzyme on the surface of the carrier, and the bonding agent improves bonding of the modified enzyme to the carrier;

placing the air filter in an air handling system; and passing air through the air filter.

32. The method of claim 31, wherein the air is purified of one or more of bacillus subtilis, bacillus cereus, and bacillus anthracis.

33. The method of claim 31, wherein the enzyme comprises a mixture of β-1,3-glucanase substituted acetyl cellulose bromide, lysozyme substituted acetyl cellulose bromide, and neutral protease substituted acetyl cellulose bromide.

* * * * *

UNITED STATES PATENT AND TRADEMARK OFFICE
CERTIFICATE OF CORRECTION

PATENT NO. : 6,730,144 B2
DATED : May 4, 2004
INVENTOR(S) : Atsuo Tanaka, Mikiko Gokano and Kazuro Isomae It is certified that error appears in the above-identified patent and that said Letters Patent is hereby corrected as shown below:

Title page,
Item [63], Related U.S. Application Data, after ", now Pat. No. 6,579,352" insert -- , which is a National Phase filing of §371 of PCT/JP97/02555, filed on July 24, 1997 --.

Signed and Sealed this

Fourteenth Day of June, 2005

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,730,144 B2 |
| APPLICATION NO. | : 10/013711 |
| DATED | : May 4, 2004 |
| INVENTOR(S) | : Mikiko Gokano, Kazuro Isomae and Atsuo Tanaka |

It is certified that error appears in the above-identified patent and that said Letters Patent is hereby corrected as shown below:

On the Title page, after item (22) and before item (65), please insert the following:

(30)  Foreign Application Priority Data

July 25, 1996   (JP)…………………………..196288/1996

Signed and Sealed this

Third Day of June, 2008

JON W. DUDAS
*Director of the United States Patent and Trademark Office*